United States Patent
Montgomery et al.

(10) Patent No.: US 6,512,892 B1
(45) Date of Patent: Jan. 28, 2003

(54) 3D CAMERA

(75) Inventors: David James Montgomery, Iffley (GB); Graham John Woodgate, Henley-on-Thames (GB); Graham Roger Jones, Faringdon (GB); Nicolas Steven Holliman, Wallingford (GB); Delman Lee, The Peak (HK)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/662,563

(22) Filed: Sep. 15, 2000

(30) Foreign Application Priority Data

Sep. 15, 1999 (GB) ............................................ 9921638
Oct. 26, 1999 (GB) ............................................ 9925172

(51) Int. Cl.[7] ............................................. G03B 35/00
(52) U.S. Cl. ....................................................... 396/326
(58) Field of Search ................................. 396/322, 324, 396/325, 326, 329, 333, 297

(56) References Cited

U.S. PATENT DOCUMENTS

| | | | | |
|---|---|---|---|---|
| 5,200,828 A | * | 4/1993 | Jang et al. | 396/89 |
| 5,329,325 A | * | 7/1994 | McClellan et al. | 396/429 |
| 5,737,655 A | * | 4/1998 | Inaba | 396/324 |
| 5,937,212 A | * | 8/1999 | Kurahashi et al. | 396/326 |
| 5,974,272 A | * | 10/1999 | Kiesow et al. | 396/333 |
| 6,246,837 B1 | * | 6/2001 | Kageyama et al. | 396/287 |
| 6,292,634 B1 | * | 9/2001 | Inaba | 396/326 |

FOREIGN PATENT DOCUMENTS

| EP | 0 888 017 A2 | 12/1998 |
|---|---|---|
| GB | 2168565 A | 6/1986 |

OTHER PUBLICATIONS

Norman Goldberg, Camera Technology: The Dark Side of the Lens, 1995, Academic Press, Inc., pp. 35–44.*

* cited by examiner

Primary Examiner—Christopher Mahoney
(74) Attorney, Agent, or Firm—Renner, Otto, Boisselle & Sklar, LLP

(57) ABSTRACT

A 3D camera includes at least two detector heads which are moveable laterally with respect to each other but whose optical are maintained parallel. Each of the detector heads includes a zoom lens and a detector. A user selects the separation between the detector heads and the camera electronics automatically select the field of view by controlling the zoom lenses as a function of the detector head separation.

33 Claims, 17 Drawing Sheets

FIG. 16
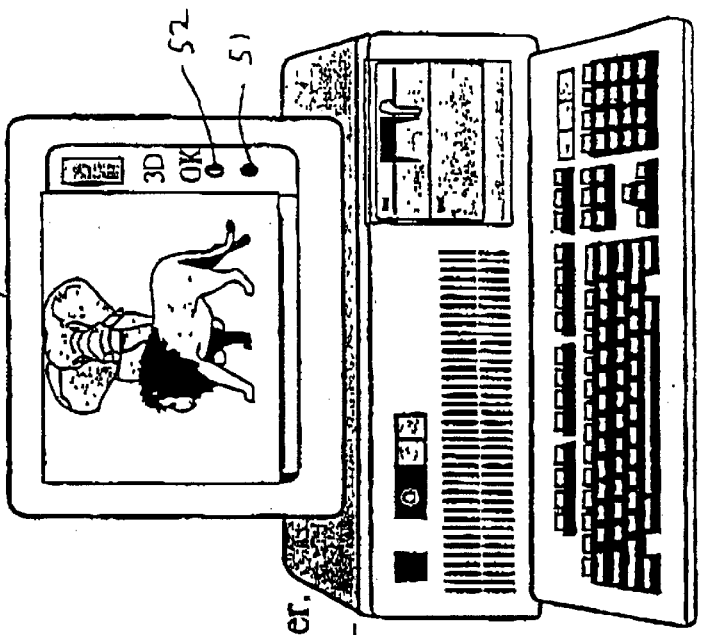
Computer with display and LED indicator. Camera parameters programmed.
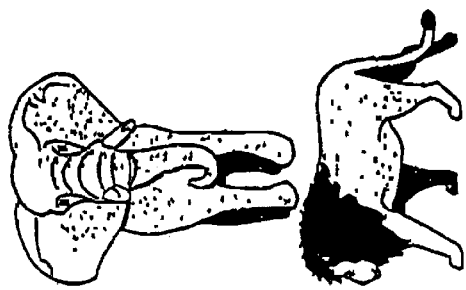
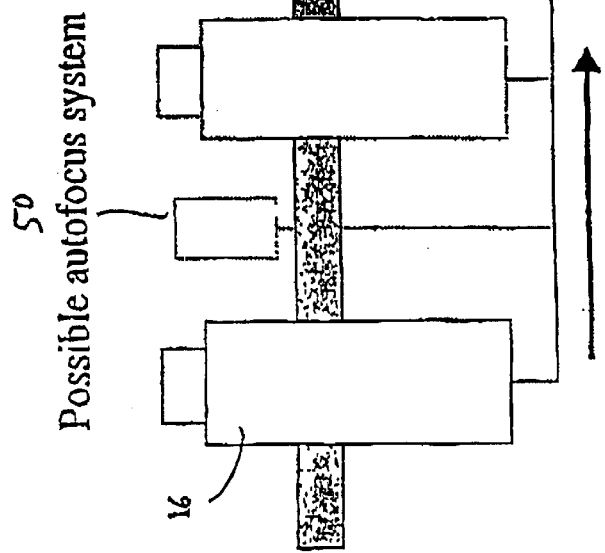
Slide bar with encoder.
Possible autofocus system

3D CAMERA

BACKGROUND OF THE INVENTION

1. Field of the Invention

The present invention relates to a stereoscopic three-dimensional (3D) camera. Such a camera may be used in consumer and professional photography, 3DTV, police identification, medical imaging, and scientific visualisation.

2. Description of the Related Art

Human beings have two eyes 1 and 2 as shown in FIG. 1 of the accompanying drawings. The eyes are disposed side by side, separated by a distance that varies from person to person but averages at about 65 mm. The eyes see a three dimensional world from two slightly different points of view as illustrated at 3 and 4. Objects such as 5 and 6 close to the eyes are seen from different angles and such objects appear shifted, relative to more distant objects such as 7, when the views from both eyes are compared as shown at 8. This shift is called 'Parallax'. This parallax is dependent on the distance from the eyes such that the further away the objects are, the smaller is the shift or parallax.

This is known as 'Binocular Vision' and enables a person to judge distance to an object and thus assess size when no other cue (such as motion, memory or perspective) exists to judge the distance. This ability to judge the distance is called 'Stereopsis', meaning 'solid seeing'.

The discovery of stereopsis and photography were put together early. If a camera could mimic one eye and produce a 2D photograph, then it was assumed that two cameras, set up at a similar distance apart as the human eyes, could mimic the 3D stereopsis effect as well. Each photograph mimics the image taken from each eye with the corresponding parallax and shifts necessary to judge distance by stereopsis alone. The two photographs thus obtained would need to be displayed to an observer with one photograph to one eye and the other to the other.

A small system of lenses achieved this. Known as a Stereoscope, it was quite popular among upper and middle class families by the 1850's. It was not long after the invention of moving pictures that moving 3D films were shown.

Many methods of display are known including the stereoscope, anaglyph (red/green glasses) and LCD switchable glasses, autostereoscopic methods (where no glasses at all are required), head tracking displays and virtual reality. However, any display can be only as good as the photographs or images that are presented to it.

FIG. 2 of the accompanying drawings illustrates the "real world" situation where the eyes 1 and 2 look at objects 6 and 7 at different distances from the eyes. When the eyes are looking at the distant object 7, the "optical axes" of the eyes converge on the object 7 and the eyes focus on a focus plane 9 at the object. Conversely, when the eyes focus on a nearer object 6, the optical axes converge and the eyes focus at another focus plane 10.

FIG. 2 also illustrates what happens during 3D viewing of a display having a display screen 11. Irrespective of the apparent distance of the images 12 and 13 from the viewer, the eyes 1 and 2 must maintain the display screen 11 in focus. Images such as 12 which appear in front of the screen have negative parallax whereas images such as 13 which appear behind the screen have positive parallax. Although the eyes 1 and 2 must maintain the screen 11 in focus, eye convergence has to vary according to the perceived distance to the image. Thus, in a 3D photograph, the parallax defines the convergence in the usual way but the eyes must have the fixed distance to the photograph or screen remaining in focus.

It is well known that a certain amount of mismatch between accommodation and convergence is considered to be tolerated comfortably, allowing 3D photography to function within limits of depth either side of the focus distance. This results in limitations to the parallax on the photographs in the horizontal direction. In addition, significant vertical parallaxes can cause serious viewer fatigue.

This places significant tolerances on the cameras, their design, construction and use. The parallax produced on the photographs depends on many variables, e.g. the separation of the cameras, zoom and field of view, convergence, display method, etc. They must all be controlled so as to keep both horizontal and vertical parallaxes on the two photographs within comfortable limits. In known systems, this requires specialist knowledge and experience on the part of the cameraman.

Many designs for cameras have been made. The three most common are a single camera moved on a slide, a single camera with extra mirrors and optics, and a two camera design. The following references provide representative prior art in this field.

"Foundations of the stereoscopic cinema" Lipton. Van Nostrand, 1982 ISBN 0-442-24724-9 pages 114 to 115 described one form of the camera equation which is described hereinafter.

GB 2 250 604 refers to an adapter that can be attached to any camera. This adapter contains two mirrors and a zoom lens. The convergence of the mirrors and zoom compensation are controlled by computer to obtain two homologous images with maximal overlap.

WO 96/15631 refers to a method called "Disparity Shifting" where two homologous images are superimposed as anaglyph with an offset in the x and y directions. This artificially changes the parallax on the 3D image to compensate for zoom, convergence, etc. changing the parallax.

GB 2 168 565 refers to a two-camera apparatus, adjustable according to separation, zoom and convergence. The zoom is optical and is effected on both cameras equally by a mechanism presented in the patent. The three variables can be controlled by microcomputer according to input data. No indication of how the relationship between zoom and inter-axial separation is obtained for comfortable images is given. Further, the apparatus is limited to cameras whose optical axes converge so that this document teaches away from the use of parallel optical axes. A disadvantage with converging cameras is that they produce vertical parallax in the captured images (ie. keystone distortion).

JP 9-215012 discloses a 2D/3D video camera incorporating 2D and 3D video images. The images are displayed on an LCD panel on the camera are viewed using a separate stereoscope. The 3D images are captured by two fixed camera heads.

U.S. Pat. No. 4,768,049 refers to a method of positioning a single camera in two positions accurately using a slide bar, referring directly to stereo photography. Such a camera cannot capture accurate still images of moving scenes.

U.S. Pat. No. 5,063,441 discloses a stereoscopic video camera with parallel optical axes and camera image sensor elements which are adjustable so that the sensors are exposed to different portions of the images from respective lenses. However, the separation between zoom lenses of the camera is fixed.

U.S. Pat. No. 4,418,993 discloses an arrangement for controlling convergence and separation so as to maintain an object at the image centre when zoom is effected in order to reduce the parallax of the object to comfortable limits. However, simultaneously control of three parameters is required and, because of the convergence of the optical axes, acceptable results cannot be obtained with distant backgrounds. Converging the cameras also produces unacceptable results due to keystoning. Also, such a system is expensive and complex and is not easily controlled by an unskilled user.

SUMMARY OF THE INVENTION

According to the invention, there is provided a three dimensional camera comprising: at least one imaging and detecting device which is moveable in a direction substantially perpendicular to the optical axis thereof; defining means for defining a depth range of a scene whose image is to be captured at first and second positions; and deriving and limiting means for deriving as a function of the depth range a separation between said first and second positions and for limiting the separation such that the parallax between images captured at the first and second positions is less than a predetermined maximum parallax, wherein the optical axes of the or each device in said first and second positions are parallel.

The at least one device may comprise at least two imaging and detecting devices whose optical axes are substantially parallel to each other.

The camera may comprise a visual indicator for indicating whether a stereoscopic image to be captured is within predetermined parallax limits. The indicator may comprise a viewfinder or an indicator light.

The predetermined maximum parallax may be a function of a predetermined display geometry on which captured images are intended to be displayed. The predetermined display geometry may comprise display screen size, intended viewing distance and eye separation.

The defining means may be arranged to define at least one fixed depth range limit. The at least one fixed depth range limit may comprise infinity. The at least one fixed depth range limit may comprise a camera minimum focus distance.

The defining means may comprise first selecting means for manually selecting the depth range. The first selecting means may be arranged to provide manual entry of the depth range or to select from a plurality of predetermined depth ranges.

The defining means may be arranged to measure at least one depth range limit. The defining means may comprise an auto-focus sensor. The at least one depth range limit may comprise a near depth point. The defining means may comprise second selecting means for manually selecting from a plurality of fixed far depth points.

The or each device may have a variable field of view. The camera may comprise third selecting means for manually selecting one of the separation and the field of view and fourth selecting means for automatically selecting the other of the separation and the field of view as a function of the one of the separation and the field of view.

The function may be a monotonically increasing function.

The function may also be a function of the maximum and minimum distances from the camera of objects whose images are to be captured.

The function may also be a function of the geometry of a display for displaying images captured by the camera. The camera may comprise means for supplying to the fourth selecting means data representing the display size and viewing distance.

The devices may be substantially identical to each other.

The detectors of the devices may be disposed in a common plane substantially perpendicular to the optical axes.

The detector of at least one of the devices may be offset laterally with respect to the optical axis of the device.

The field of view of each device may be selectable by selecting a portion of the detector.

The field of view of each device may be selected by adjusting the focal length of an imaging optical system of the device. The devices may comprise zoom lenses whose optical nodes are disposed in at least one common plane perpendicular to the optical axes.

One of the devices may be fixed.

The camera may comprise more than two devices with the spacings between adjacent pairs of the devices being maintained substantially equal to each other.

The detector of each device may be rotatable through substantially 90° about the optical axis of the device.

The detector of each device may comprise a charge-coupled device.

It is thus possible to provide a 3D camera which is capable of capturing images over a wide range of distances from the camera. By limiting the maximum parallax which is captured, subsequently displayed captured images are viewed comfortably by a viewer. Such a camera may provide hard copies, for example in the form of photographs, or may supply images which are stored electronically, for example in semiconductor memories, floppy disks and CD ROMs. The camera may also be in the form of a video camera for capturing moving 3D images, for example for display on a suitable video rate 3D display.

A user need not have specialist knowledge in order to obtain 3D images which are suitable for display while providing good-quality 3D appearance. For example, in one form, the user manually changes the separation of the device and the field of view or zoom setting is automatically calculated and applied using, for example, pre-set or manually input values of display geometry, human factors and/or distance ranges. For cameras including autofocus systems, such systems may provide distance data directly. In this case where the user manually selects the device separation, the zoom function maintains the same parallax conditions for viewing. It is thus possible to provide a compact 3D camera which is easy to handle.

Extra-wide base line 3D photographs or other captured images are possible if one device is detachable or extendable, for example on a slide. Also, objects with maximum depths of less than infinity can be imaged into a more useful depth on a display.

Such a camera may also be used in a two dimensional (2D) mode, for example to allow 2D digital photographs to be easily obtained. Furthermore, one or more of the devices may be "toed-out" so as to allow an extra wide 2D panoramic picture to be obtained, for example when processed by means of seam matching software.

BRIEF DESCRIPTION OF THE DRAWINGS

The invention will be further described, by way of example, with reference to the accompanying drawings, in which:

FIG. 16 is a diagram illustrating a single detector head camera constituting an embodiment of the invention.

DESCRIPTION OF THE PREFERRED EMBODIMENTS

Figure 1:
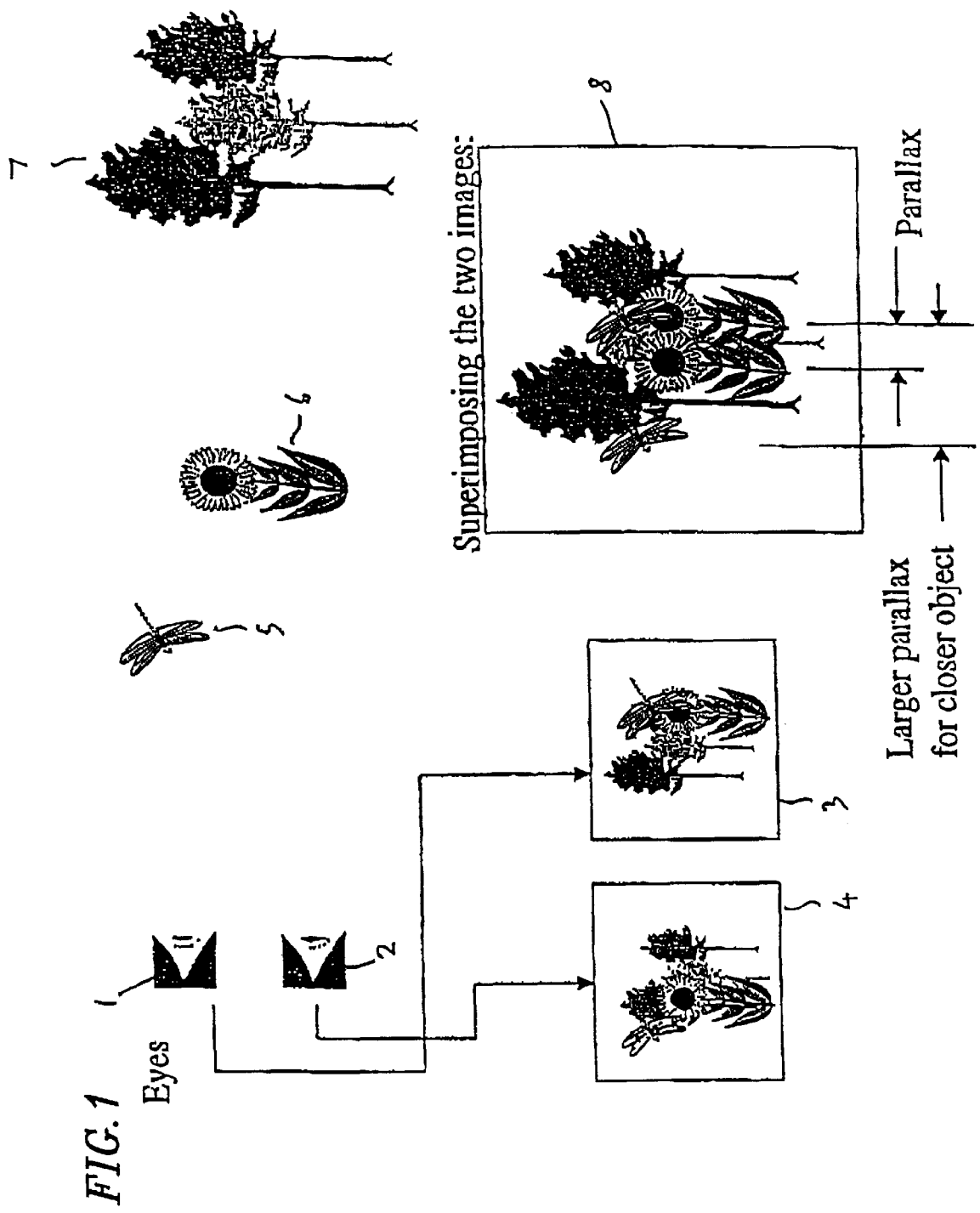
FIG. 1 is a diagram illustrating parallax in human vision.
Figure 2:
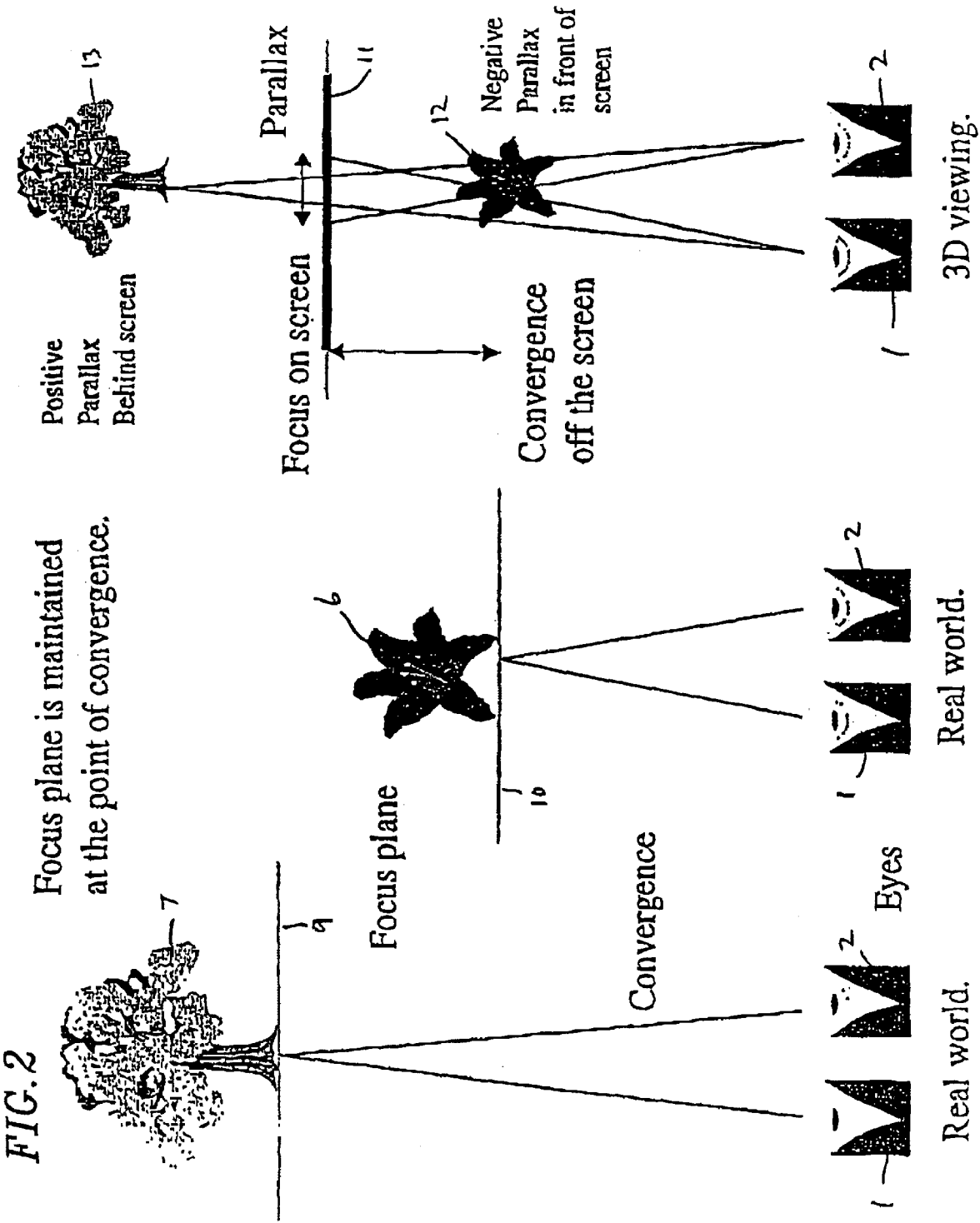
FIG. 2 is a diagram illustrating focusing and convergence when viewing objects and a 3D display.

Like reference numerals refer to like parts throughout the drawings.

Figure 3:
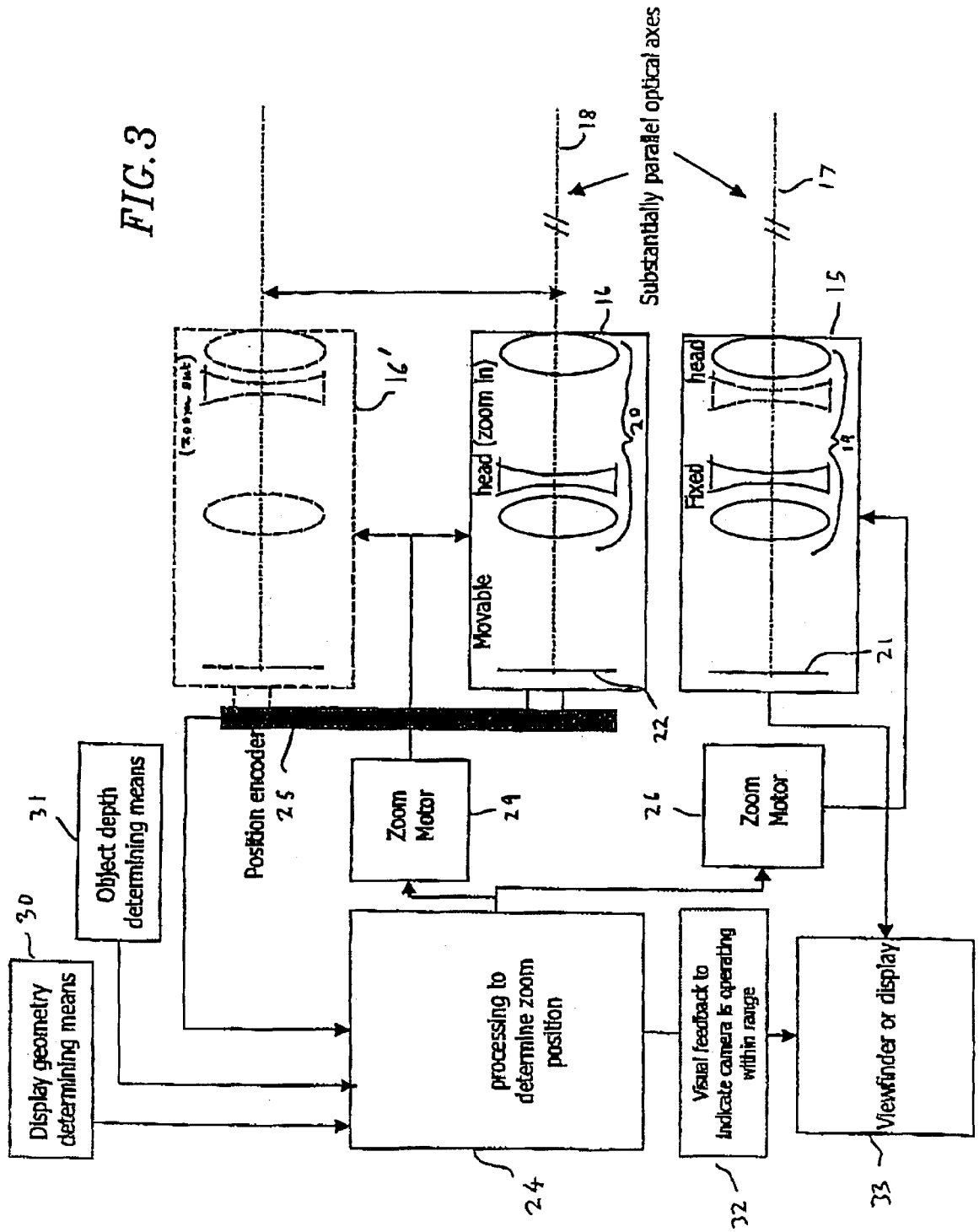
FIG. 3 is a schematic diagram of a 3D camera constituting an embodiment of the invention.
Figure 4:
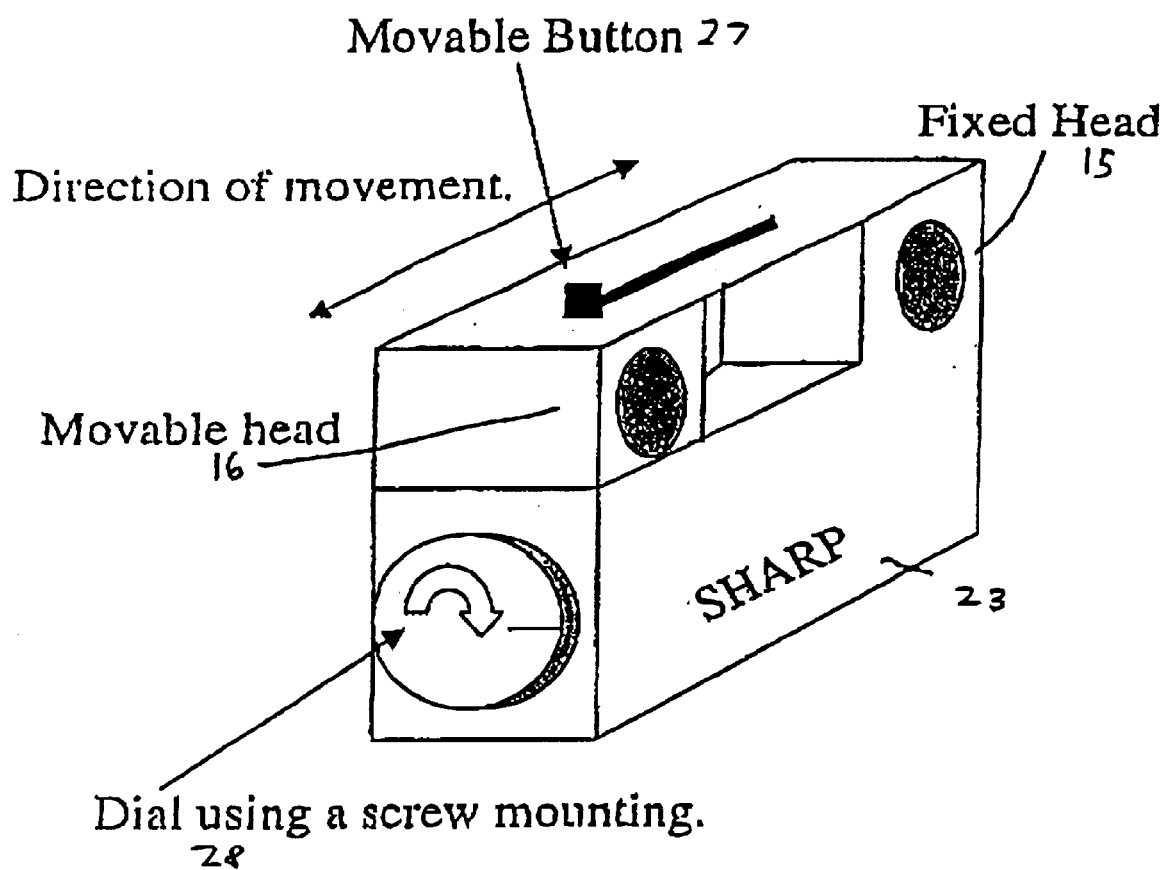
FIG. 4 is a drawing illustrating a possible arrangement of the camera of FIG. 3.

FIGS. 3 and 4 illustrate a 3D camera comprising two detector or camera heads 15 and 16. The head 15 is fixed with respect to the body 23 of the camera, whereas the head 16 is moveable as far as the position shown at 16'. The heads 15 and 16 have optical axes 17 and 18 which are parallel to each other irrespective of the separation between the detector heads 15 and 16. Each of the detector heads comprises a lens 19, 20 in the form of a zoom lens and a detector 21, 22 in the form of a charge—coupled device sensor. The detector heads 15 and 16 are substantially identical to each other and the detectors 21, 22 are disposed in a common plane which is perpendicular to the optical axes 17 and 18.

The moveable head 16 is arranged to move along a slide such that the optical axes 17 and 18 remain parallel to each other and the detectors 21, 22 remain in the common plane perpendicular to the optical axes. The lateral separation of the heads 15 and 16 is controlled by a user. For example, the head 16 may be moved mechanically along the slide by means of a moveable button 27 fixed to the head 16 and pushed by the finger of the user. Alternatively, a dial 28 with a screw-mounting for the head 16 may be rotated by the user so as to adjust the separation between the heads 15 and 16. In another alternative, the button 27 or the dial 28 controls electromechanical means for moving the head 16.

The position of the moveable head 16 is determined by a position encoder 25 and supplied to a circuit 24 for determining the field of view or focal length of the lenses 19 and 20. The position encoder 25 may comprise a linear potentiometer. As an alternative, where the moveable head 16 is moved by means of a stepper motor, position encoding may be provided by counting steps of the motor. The circuit 24 controls zoom motors 26 and 29, which control the focal lengths are synchronised with each other so as to have the same value.

The circuit 24 also receives details of the geometry of the display for which the captured images are intended from determining means 30. This may, for example, be in the form of preset values referring to a typical display screen size and typical intended viewing distance. Alternatively, the means 30 may permit a user to enter the appropriate data for a specific display.

The circuit 24 further receives object depth information from object depth determining means 31. The object depth determining means 31 may allow manual selection, for instance by inputting distances from the camera to the nearest and furthest points in the image to be captured or by selecting from several preset depth ranges that which is most appropriate to the image to be captured. In a particularly simple arrangement, the object depth determining means 31 merely specifies the far point at infinity and the near point at the minimum focusing distance of the camera. In more sopisticated embodiments, for example where the camera is of the autofocus type, the autofocus sensor may supply one or more of the depth range limits. For maximum flexibility, it may be possible to point the autofocus sensor at the nearest and furthest points in the image to be captured so that accurately measured distance data are supplied to the circuit 24. In a simpler arrangement, the far point is preset, for example at infinity, and the autofocus sensor is used to measure the distance to the near point. Alternatively, the far point may be manually selected from a set of options while the autofocus sensor determines the near point.

In addition to controlling the zoom motors 26 and 29 and hence the focal lengths of the lenses 19 and 20, the circuit 24 supplies a visual feedback 32 to indicate whether the camera is operating within the allowed conditions. For example, if at any point the maximum parallax condition is exceeded, a visual indicator which may be integrated into a viewfinder or display 33 can indicate to the user that the images captured with the existing settings of the camera will not be suitable. Similarly, an indication may be provided to show that too little depth is likely to be recorded for satisfactory 3D perception of the captured images.

The images captured by the detectors 21, 22 are supplied to processing electronics, for example forming part of the electronics 24, which process the captured images as required and supply outputs, for example to a computer for subsequent processing and/or display. The camera and/or the computer may include printers for providing hard copies of the images, for example for viewing by means of a stereoscope. Alternatively, the display may be of electronic type, for example as disclosed in EP 0 602 934, EP 0 625 861, GB 2 321 815, EP 0 860 728, GB 2 317 295 and EP 0 829 744.

The camera electronics 24 receive the signals representing the separation between the heads 15 and 16 from the position encoder 25 for sensing the position of the moveable head 16. The camera electronics 24 supply signals for controlling the focal length of the zoom lenses 19, 20 so as to determine the field of view of the camera as a monotonically increasing function of the separation between the heads 15 and 16. Thus, when the heads 15 and 16 are separated by the maximum separation, the lenses 19, 20 are controlled so as to have the widest field of view. Conversely, when the separation between the heads 15 and 16 is set to a minimum, the lenses 19, 20 are controlled so as to have the narrowest field of view in the available range.

Alternatively or additionally, the field of view may be controlled by selecting in the camera electronics 24 the proportion of the light sensitive surface of the detectors 21, 22 at which the images are to be captured. This may be used to allow fixed focal length lenses to be used or to augment the field of view range provided by zoom lenses.

The viewfinder or display 33, which may comprise a liquid crystal display and which may be integral with the camera or separate therefrom, allows a user to compose the desired image. In particular, the image captured by at least one of the detector heads 15, 16 is supplied via the camera electronics 24 to the viewfinder 33. Thus, the viewfinder 33 provides a 2D display, because a 3D display is not necessary for composing the view and may not accurately show stereoscopic images included for a different type of display. For example, any 3D display provided in the camera would generally be of much smaller size than the intended display, which may for example be a work station display. If the user were to compose an image to have an acceptable depth range on such a small display, then the display of the same image on a larger display would substantially change the absolute parallax of the final displayed image. Thus, the 3D image captured for a small display is not likely to be suitable for a large image. It is therefore preferable not to compose the 3D image by means of the camera display but instead to provide an automatic arrangement for comfortable 3D image capture for the intended or target display. The viewfinder 33 is used for framing the image and the user can compose a reliable 3D image without the need to examine the image during the capture process.

In order, for example, to take accurate stereo photographs, the user zooms the image seen on the viewfinder 33 to compose the 2D image. As described above, the zoom mechanism may be by means of adjustment of the focal length of each of the two lenses 19, 20, by varying the proportion of the image sensor displayed or by a combination of the two methods. The means by which the user controls the zoom setting is by lateral translation of the detector head 16 with respect to the head 15 such that the inter-axial separation of the two camera heads varies. Once the image is appropriately framed, the image is captured. The captured image may be still or moving for photographic or video applications, respectively.

Figure 5:
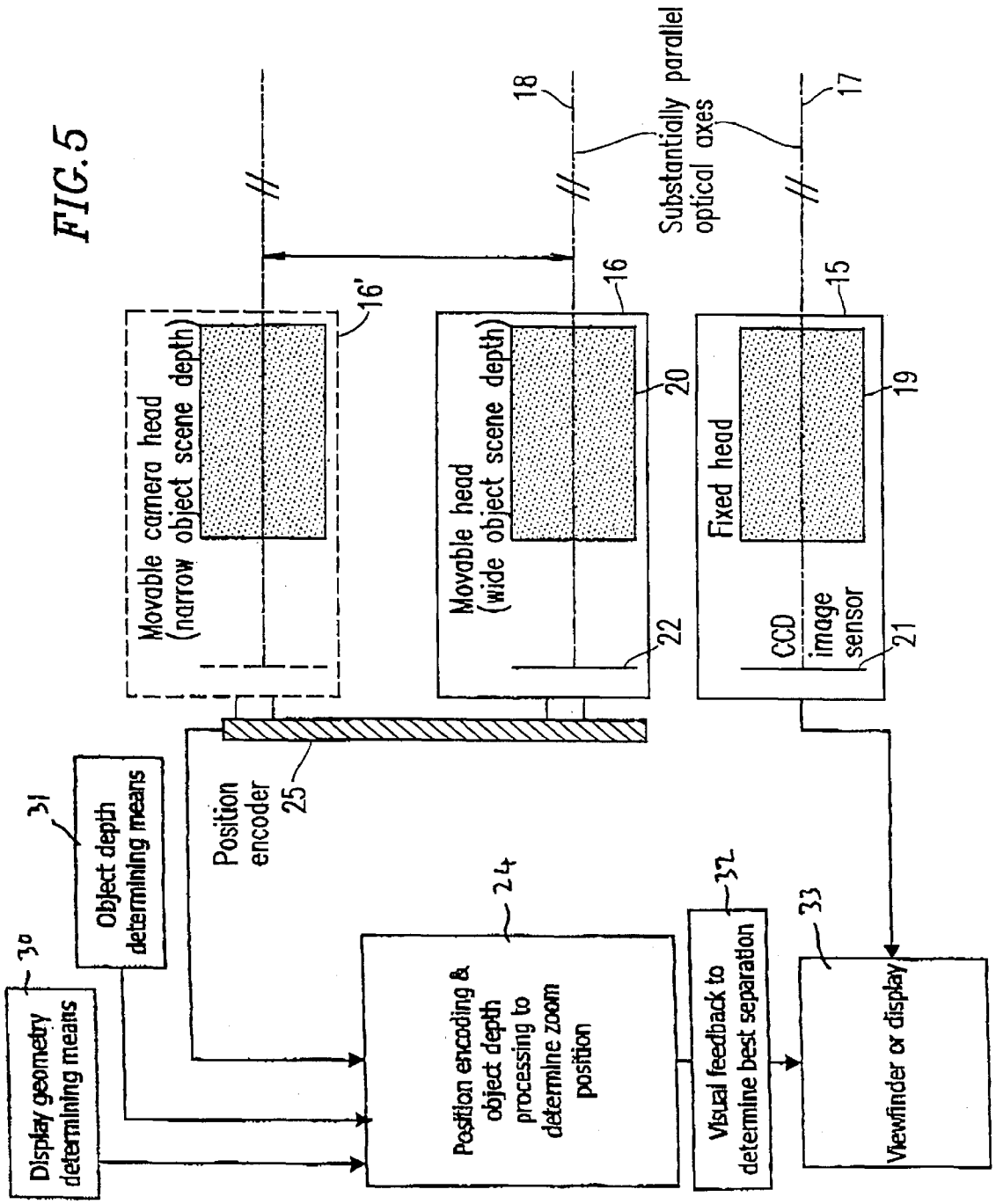
FIG. 5 is a schematic diagram of a 3D camera constituting another embodiment of the invention.

The camera shown in FIG. 5 differs from that shown in FIG. 3 in that the lenses 19 and 20 are of fixed focal length so as to provide a fixed field of view. The zoom motors 26 and 29 are therefore not necessary. Alternatively, for cameras having zoom lenses, the following operation may be adopted if the user is able to fix the focal length.

It is possible that the depth range of a scene may change, in which case the separation between the heads 15 and 16 may be adjusted to compensate for the different depth range. A user may adjust the separation of the heads 15 and 16 so that the parallax captured for the particular scene depth range is restricted to be within predetermined limits. For example, the camera display 33 may have a display icon such as a green light to show the separation at which the parallax captured by the camera is within acceptable limits based on the scene depth supplied to the camera. If the parallax is too large or too small, a red indicator may be shown on the display.

In the cameras shown in FIGS. 3 and 5, a warning may be given to the user if there is too much or too little depth in the scene for the current conditions. Such a situation may occur if the depth range is so large that the required separation between the heads 15 and 16 is smaller than the minimum separation which is achievable with the mechanical design of the camera. In the non-zoom camera shown in FIG. 5, the warning may be used to set optimum separation.

Figure 6:
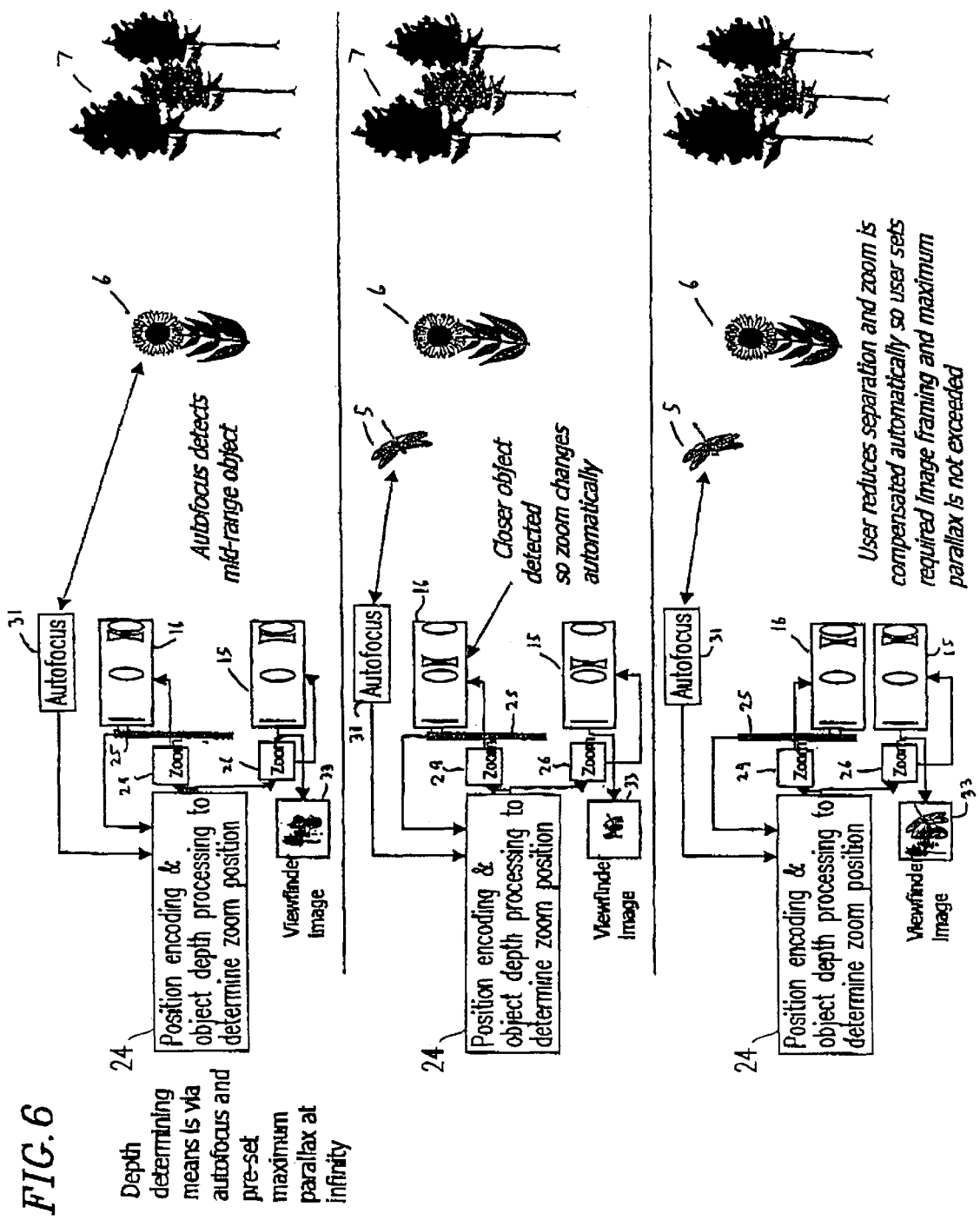
FIG. 6 is a diagram illustrating use of the camera of FIG. 3.

FIG. 6 illustrates an example of operation of a camera of the type shown in FIG. 3 having an object depth determining means 31 in the form of an auto-focus system which detects the near point, the far point being fixed at infinity. The upper part of FIG. 6 illustrates the separation and zoom lens settings for a scene where the nearest object detected by the auto-focus system 31 is at 6 with the background 7 approaching infinity. The middle part of FIG. 6 illustrates what happens when a closer object 5 enters the scene. For the particular separation of the heads 15 and 16, the field of view has to increase so as to maintain the maximum parallax condition. The electronics 24 cause the lenses of the heads 15 and 16 to adjust the zoom setting automatically and the user sees this on the viewfinder 33. The user may then adjust the separation as illustrated in the lower part of FIG. 6 so that the electronics 24 alter the focal lengths of the zoom lenses to reframe the image correctly as required by the user. The separation of the heads 15 and 16 is reduced so that the maximum parallax condition is maintained. If the separation required for the depth range of the scene is smaller than is allowed mechanically, an indicator warns the user that the maximum parallax condition has been exceeded for the available depth of scene.

Such a 3D camera produces two homologous images from two slightly different points of view of the same scene. An object in the field of view will appear in slightly different lateral positions on the two images. The separation of the two lateral positions depends on the distance of the object from the camera and is called parallax.

Autostereoscopic and stereoscopic display devices are well known and operate by presenting each eye of an observer with separate images. Thus, each detector 21, 22 sees one of the two captured images and the image parallax recorded in the capture stage is replayed to the observer. The images are fused to give the impression of an image with depth.

The camera allows the user to control the amount of parallax captured by a 3D camera such that, when the images are replayed, a comfortable amount of depth may be presented. In particular, no knowledge by the user of 3D geometry requirements is needed during image capture.

It is known in the prior art that parallel camera axes allow the capture of robust 3D images. In particular: images can be captured with no keystone distortion (which would otherwise lead to image degrading vertical parallax); objects at infinity can be captured with finite parallax; and the optical axis convergence is fixed, which means that the difficult process of adapting it to different image scenes is unnecessary.

Figure 7:
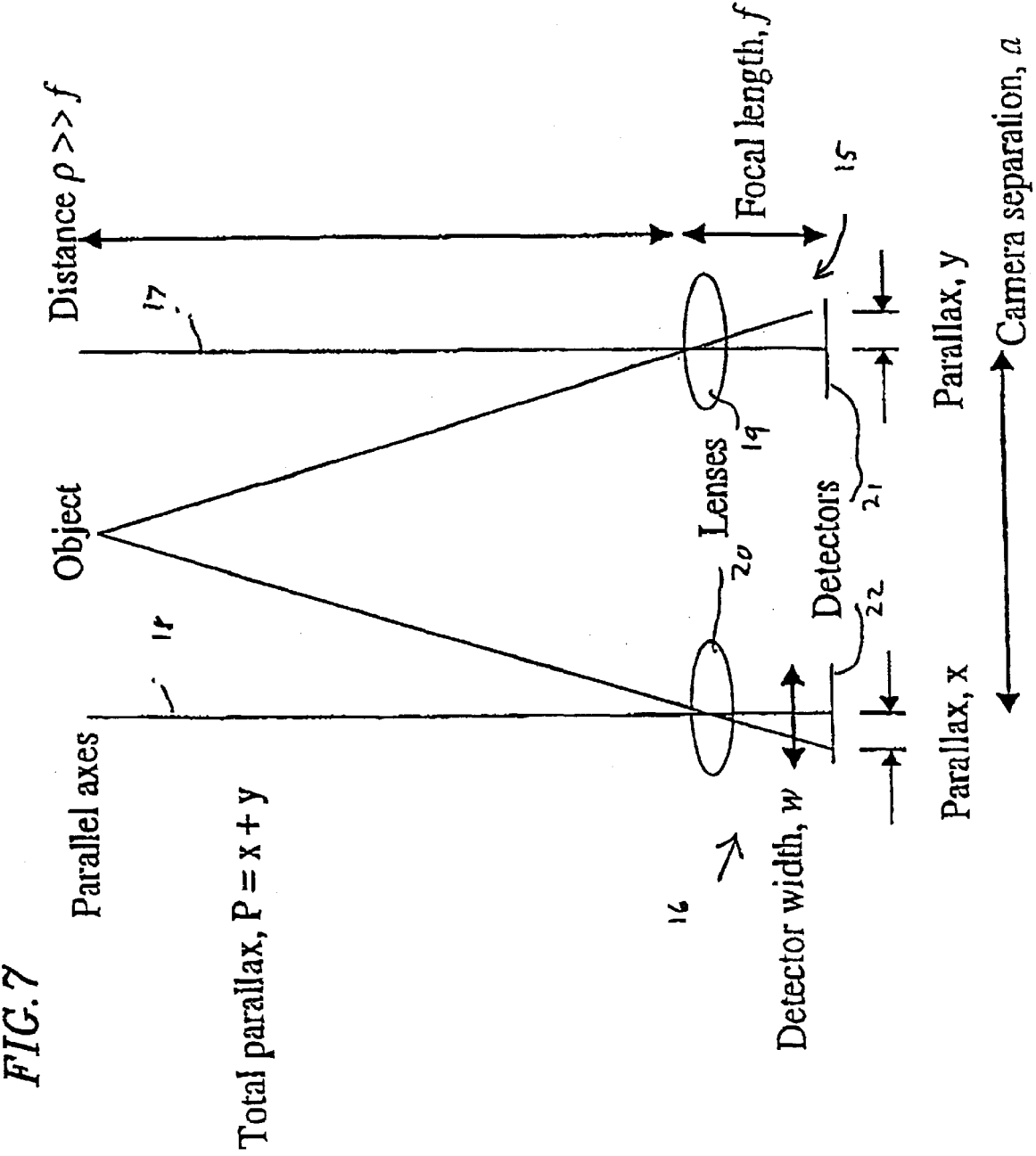
FIG. 7 is a diagram illustrating the geometry of the camera of FIG. 3.

FIG. 7 illustrates the camera geometry, in which f is the focal length of the lenses 19, 20, w is the image sensor width of the detectors 21, 22, a is the separation of the detector heads 15, 16 and ρ is the distance from the camera to the object being photographed. The horizontal parallax, P, produced by this geometry between the two homologous images in the camera is:

$$P = x + y = -fa\left(\frac{1}{\rho}\right). \quad [1]$$

The negative sign is chosen using the convention that negative parallaxes are in "theatre space", i.e. a point on the left image is to the right of the homologous point in the right image. Such a parallax will produce an apparent position in front of the screen, as the eyes have to converge more than that required for the screen, and vice versa for "screen space" parallaxes. During the 3D display of a pair of images, the final image will have a width D. If the image fills the whole screen, then D is equal to the display screen width.

The ratio of the parallax to the image width remains constant irrespective of the type of display or width of image because parallax scales linearly with display size. This ratio is equal to $P_s/D$, where $P_s$ is the parallax seen on the 3D display. Thus:

$$\frac{P}{W} = \frac{P_S}{D} = -a\left(\frac{f}{w}\right)\left(\frac{1}{\rho}\right). \quad [2]$$

To a first order approximation neglecting aberrations, the ratio f/w is related directly to the field of view, θ, of the camera through the equation:

$$w = 2f \tan(\theta/2). \quad [3]$$

Hence, equation [2] can be written in the following form:

$$\frac{P_S}{D} = -\frac{a}{2\tan(\theta/2)}\left(\frac{1}{\rho}\right) = -\frac{\alpha}{\rho}. \quad [4]$$

Here, α is known as the Object Parameter and is only dependent on the camera characteristics and has a dimension of distance. It is defined by:

$$\alpha = \frac{a}{2\tan(\theta/2)}. \quad [5]$$

Figure 8:
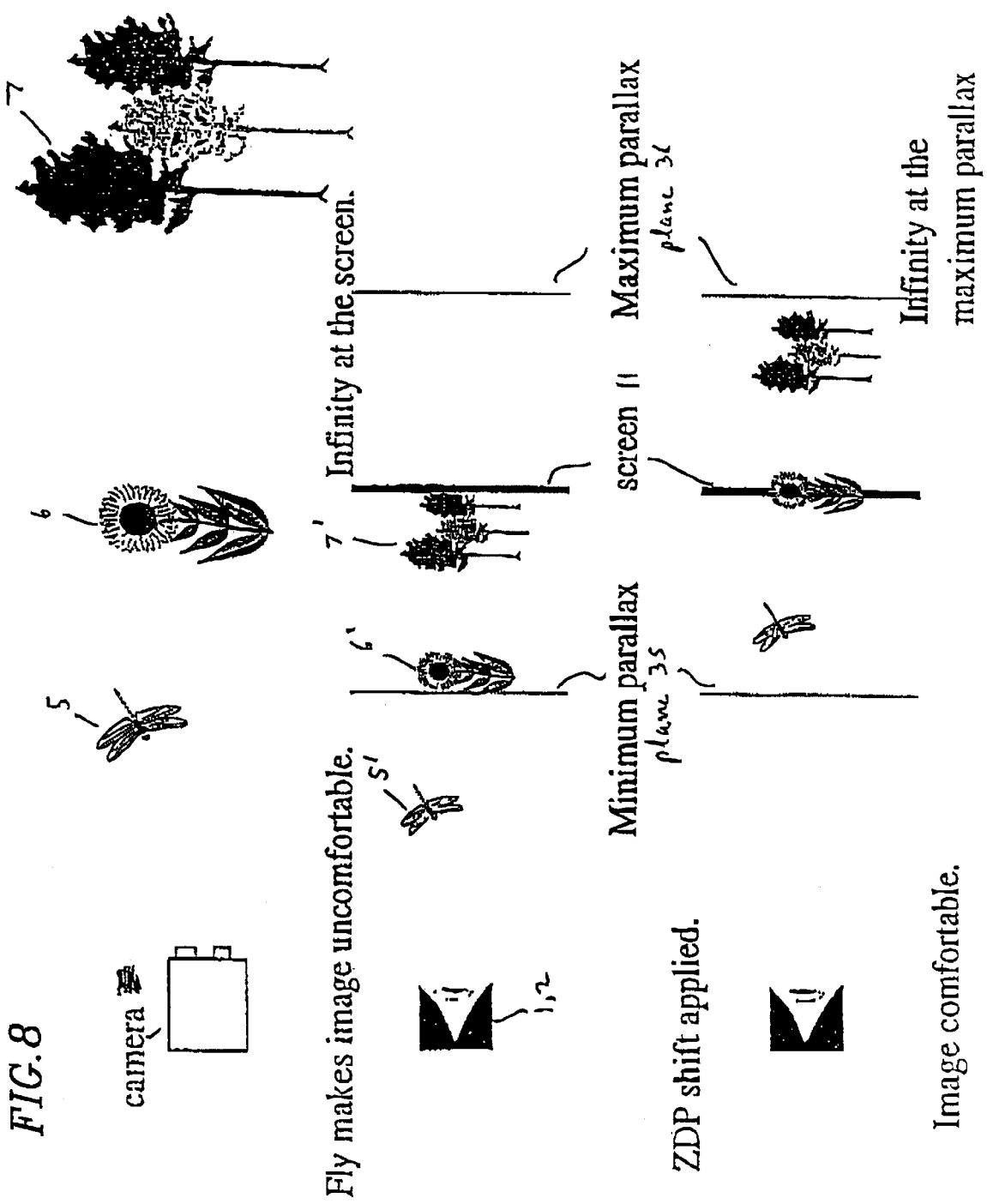
FIG. 8 is a diagram illustrating zero disparity point correction.
Figure 9:
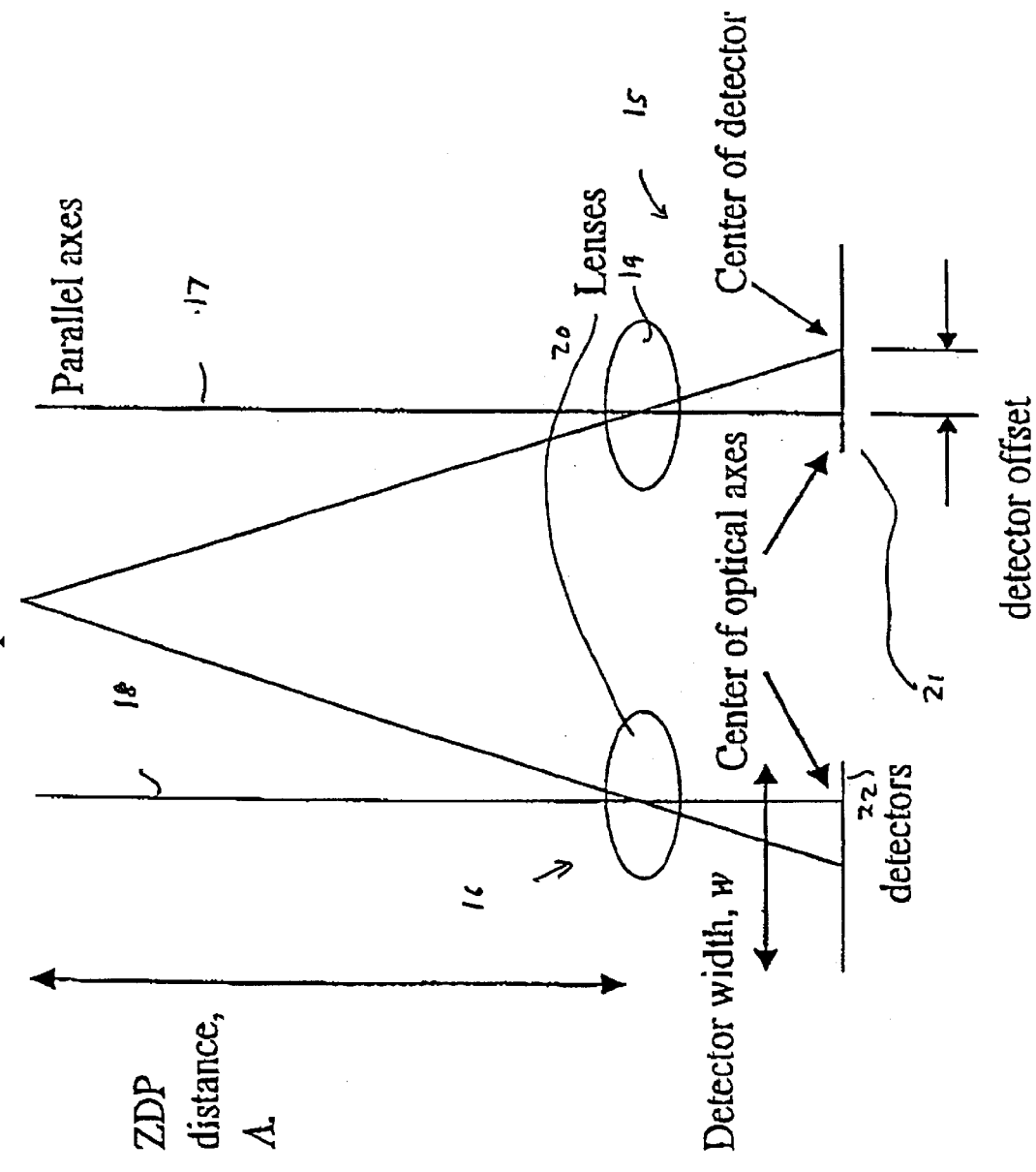
FIG. 9 is a diagram illustrating the geometry of a camera of the type shown in FIG. 3 but provided with detector offsets.
Figure 10:
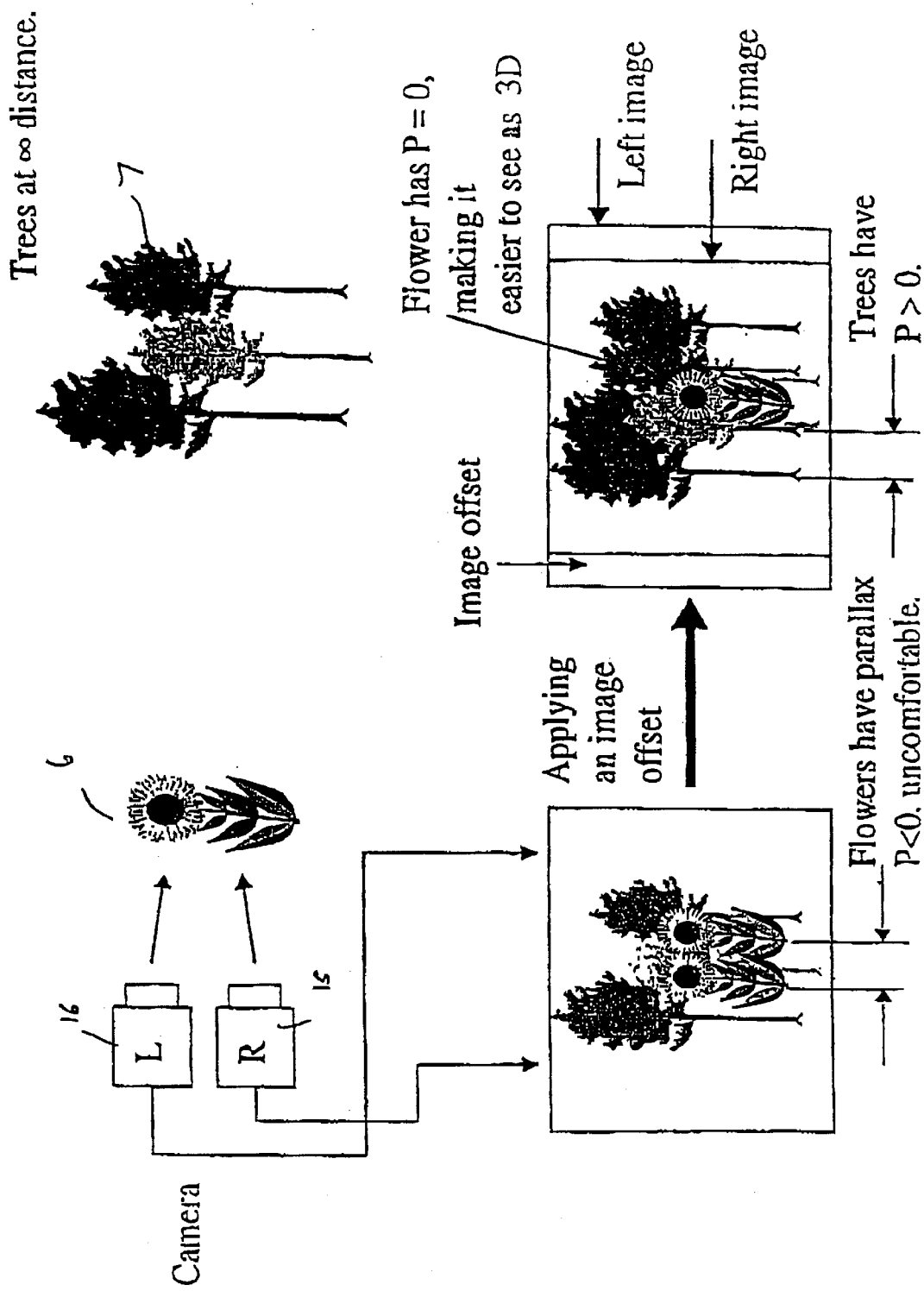
FIG. 10 is a diagram illustrating parallax shifting.

In this configuration, objects at infinity will have zero parallax. For example, FIG. 8 illustrates the camera capturing images of the objects 5, 6 and 7 of the type shown in FIG. 1. When viewed on the display screen 11, objects at infinity appear to be at the screen plane. All objects at a finite distance will be imaged with negative parallax and appear to be in front of the screen as illustrated by the images 5', 6', 7' of the objects 5, 6, 7. Images such as 5' appear closer than a plane of minimum parallax and are uncomfortable to a viewer. It is often considered desirable to give infinity a positive parallax at a position behind the screen (i.e. in "screen space"), for example at a plane 36 of maximum parallax. Other objects in the scene are thus imaged around the screen plane a shown in FIG. 8. This can be achieved by offsetting the detectors by small amounts as shown in FIG. 9. Alternatively the two homologous images can be displaced horizontally relative to one another when displayed by a small percentage of the display width, $P_{offset}/D$, where $P_{offset}$ is the offset parallax produced by superimposing the images with the horizontal offset. This gives a positive parallax to infinity and is called Zero disparity point (ZDP) correction as illustrated in FIG. 10. When displayed, equation [4] thus takes the form:

$$\frac{P_S}{D} - \frac{P_{offset}}{D} = -\frac{\alpha}{\rho}. \quad [6]$$

This can be written as:

$$\frac{P_S}{D} = \alpha\left(\frac{1}{\Lambda} - \frac{1}{\rho}\right) \quad [7]$$

where Λ is the distance from the camera to the ZDP plane. This plane is the distance at which an object, imaged by the camera, would appear level with the screen when fully displayed. It is defined by $\alpha/\Lambda = P_{offset}/D$ (and equation [7] follows from that).

For a given viewing geometry of a 3D display, it is often considered in the art that there are maximum limits to the range of disparities it is acceptable to display to optimise viewer comfort while presenting useful depth cues. These maximum limits may vary dependent on at least the viewing distance, displaying size, size of image on the display, viewer eye separation and experience of users in viewing 3D images. Given knowledge of these nominal conditions, values of appropriate limits to positive and negative parallax can be ascertained.

The maximum positive parallax that can be comfortably viewed is represented by $P_{ss}$ and the minimum theatre space (or negative or crossed) parallax is represented by $-P_{TS}$. For the camera to capture appropriate images, these have to be normalised to a defined displayed image width (which may be equal to the screen width D if the image fills the whole screen) so that knowledge of both $P_{ss}/D$ and $P_{TS}/D$ (positive quantities) are thus required.

The maximum positive parallax observable, $P_{ss}/D$, can be set so that the maximum distance that the scene contains, ρ=R, would have exactly this parallax i.e. Ps/D=Pss/D. In this case:

$$\Lambda = \alpha\left(\frac{P_{SS}}{D} + \frac{\alpha}{R}\right)^{-1} \quad [8]$$

$$\frac{P_{offset}}{D} = \left(\frac{P_{SS}}{D} + \frac{\alpha}{R}\right).$$

At some minimum distance, ρ=η, the displayed parallax, Ps/D, should not exceed the minimum negative parallax observable, $-P_{TS}/D$. Thus:

$$\eta = \frac{\alpha}{(P_{SS}/D) + (P_{TS}/D) + (\alpha/R)}. \quad [9]$$

Often, the maximum distance, R, would be infinite as is often the case for outdoor image capture. Assuming this:

$$\Lambda = \frac{\alpha}{(P_{SS}/D)} \quad [10]$$

$$\frac{P_{offset}}{D} = \frac{P_{SS}}{D}$$

$$\eta = \frac{\alpha}{(P_{SS}/D) + (P_{TS}/D)}.$$

Hence, for objects at a distance between η and R, a comfortable 3D image can be obtained with objects at a distance Λ being in the plane of the screen when taken with a camera set up in a configuration defined by the value of α alone.

The geometry of such a 3D image capture system is known in the prior art. However, prior art systems with fully adjustable characteristics have required users to have knowledge of these equations in order to capture acceptable images. The invention removes this requirement from the user.

It is thus possible to capture images of objects with depth ranges of perhaps 1 meter to infinity and to display such images with a depth range of perhaps just 10 cm on a typical workstation display. This results in depth compression distortion in the 3D image. Thus, fixing the maximum and minimum parallaxes implies fixing the perceived depth on the display for a particular user. This perceived depth range would then contain all the information taken by the camera. However, under some circumstances, the depth of the object can be mapped directly into the acceptable depth range that can be shown by the display. This is the orthoscopic condition.

Figure 11:
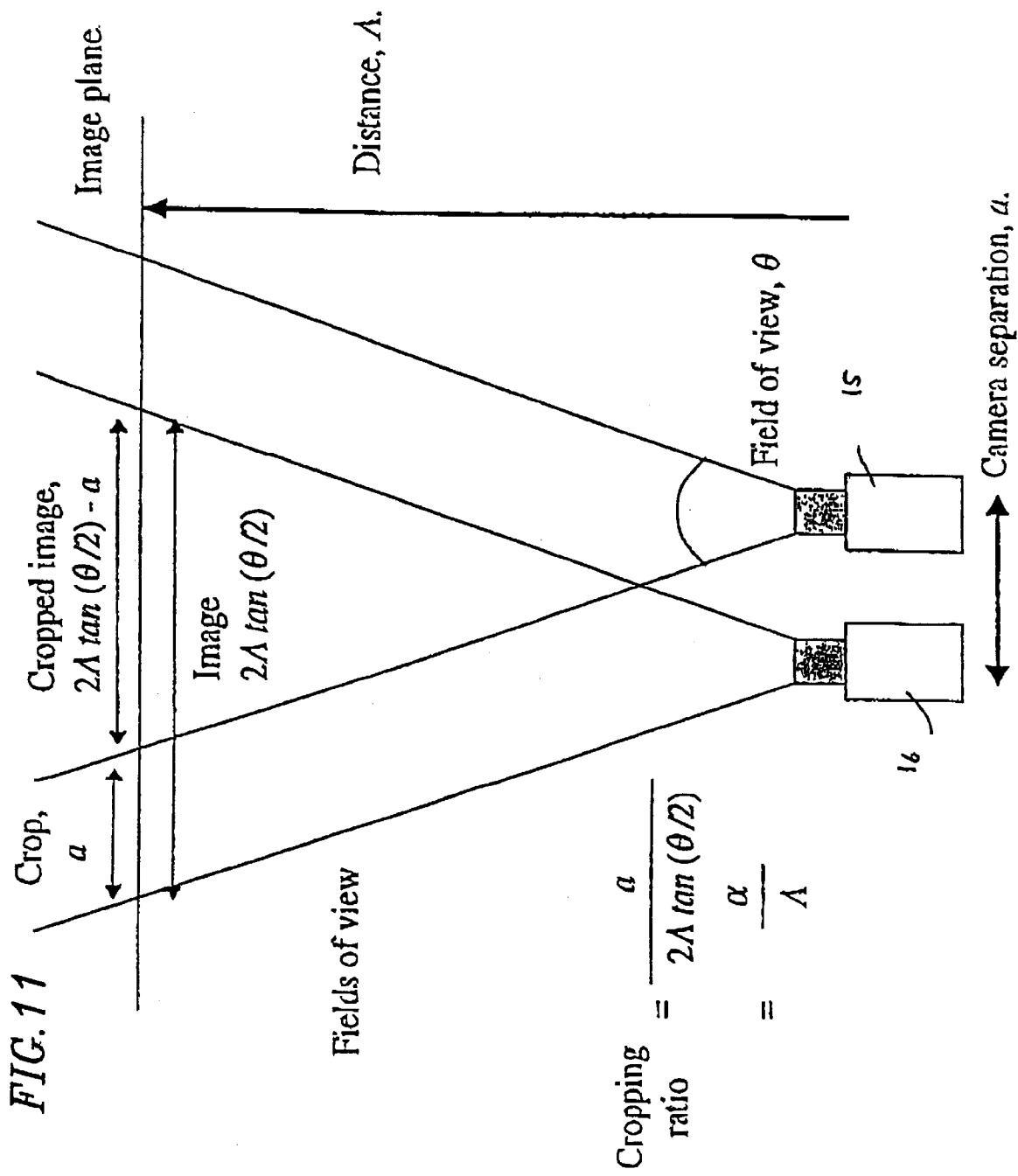
FIG. 11 is a diagram illustrating the geometry of the camera of FIG. 3 and, in particular, illustrating screen cropping.

The parallel axes nature of the camera implies that some of the information taken in each image is lost due to the fact that not all of the two homologous images overlap as illustrated in FIG. 11. This is known as screen cropping. The amount of width of view lost is always a, independent of the distance to the object, $\rho$. The size of the field at this distance is $2\rho \tan(\theta/2)$, and so the ratio lost is $\alpha/\rho$, where $\alpha$ is given in equation [5]. There is also an extra crop due to an applied image sensor/ZDP correction offset. If this offset is by using a detector offset in the camera, no extra term need by added. If it is by "post process" ZDP correction, an extra term, $P_{offset}/D$, must be added. In all cases this crop is independent of the zoom position because of the relationship between the inter-axial separation and the field of view so that the object parameter is maintained at a constant value. The total crop, C, is thus, if a mean distance of the ZDP distance, $\Lambda$, is taken because an offset is applied:

$$C = \frac{\alpha}{\Lambda} + \frac{P_{offset}}{D} = 2\frac{P_{offset}}{D}. \quad [11]$$

In one example of image capture, stereo images are to be viewed on a display of lateral width D=300 mm at a viewing distance of 600 mm for an experienced user of eye spacing 59 mm. For comfortable viewing freedom, the maximum depth allowed on the display is determined to be 60 mm in theatre space and 120 mm in screen space. Thus the maximum separation of the homologous points allowed is −6.6 mm and +9.8 mm (homologous points are two points, one in each homologous image, which are projections of the same real point in space). If we assume that the image is to be viewed at full screen width, then the ratios of parallax to screen width are $-P_{TS}/D=2.2\%$ and $P_{ss}/D=3.3\%$.

A two head camera of image sensor width 5 mm and zoom focal length range 6–20 mm (field of view angle 45° to 14°) is used to capture the stereo image of an object with a depth range from 1.5 m to infinity. From equations [8], [9] and [10] and the values of the parallaxes, the object parameter, $\alpha$, is 83 mm and the ZDP distance, $\Lambda$, is 2.5 m. By viewing the image on a 2D LCD viewfinder, the user composes the image by physically moving one lens with respect to the other. This in turn changes the zoom setting of the image displayed on the viewfinder.

During translation of the camera head, an encoder on the translation stage measures the separation of the two detector heads 15, 16. The user would like a focal length of 12 mm from the viewfinder corresponding to a field of view of 23.5° from equation [3]. Equation [5] thus indicates that a separation of 35 mm would need to be achieved by the user.

When the detector heads 15, 16 have been displaced so that the separation is 35 mm, the zoom lens is controlled so that the focal length is 12 mm. Thus, when the image is correctly composed, the separation of the detector heads 15, 16 has already been set for comfortable viewing under the defined display conditions. The user then hits the record button and a pair of images is captured. The images in digital cameras may be stored together with data on original parallax requirements, focal length, CCD size and detector head separation.

In an alternative picture, the user would like a focal length of 6 mm and so moves the detector head so as to change the separation until this is achieved. The required separation is 69 mm.

In an alternative picture, the optimal display size is changed to 20 inches (corresponding to a display width D=(4/5)×508 mm=406 mm) with the remainder of the viewing conditions fixed. In this case, the user enters into a menu on the camera the new display size. As the display size has grown but the maximum parallaxes are to remain constant, the maximum allowable P/D values drop to −1.6% and 2.4%. This changes the maximum parallax conditions and thus the rate of change of focal length with interaxial separation (the object parameter). The object parameter is now 60 mm. Thus, in order to take images with a focal length of 6 mm, a camera head separation of only 50 mm is used.

Alternatively, the target display size range may be entered e.g. 3–8", 8–17", 17–25", 25–40", 40"+ (corresponding approximately to 76–203 mm, 203–432 mm, 432–635 mm, 635–1016 mm, 1016 mm+). In each case, the worst case image conditions will be considered in setting maximum parallaxes.

In the above examples, the object scene has assumed a maximum depth range of infinity. This may well be true in many outdoor situations but often the far distance will be finite, for example in a room. In this case, the lens separation can be increased for a certain focal length to enhance the 3D effect and reduce depth compression. Take the example of a 12 mm focal length and a maximum object distance of R=10 m displayed on a 300 mm wide screen. In this case, the object parameter becomes 98 mm (from equation [8]). The separation of lenses can thus be increased to 41 mm.

Additionally, there may be a requirement to deal with close objects. Again, it is possible to modify the object parameter to cater for this. For example, an image with range from 0.5 m to 2 m would need a separation of 15 mm for a 12 mm focal length on a 300 mm wide screen, the object parameter being 37 mm.

Figure 12:
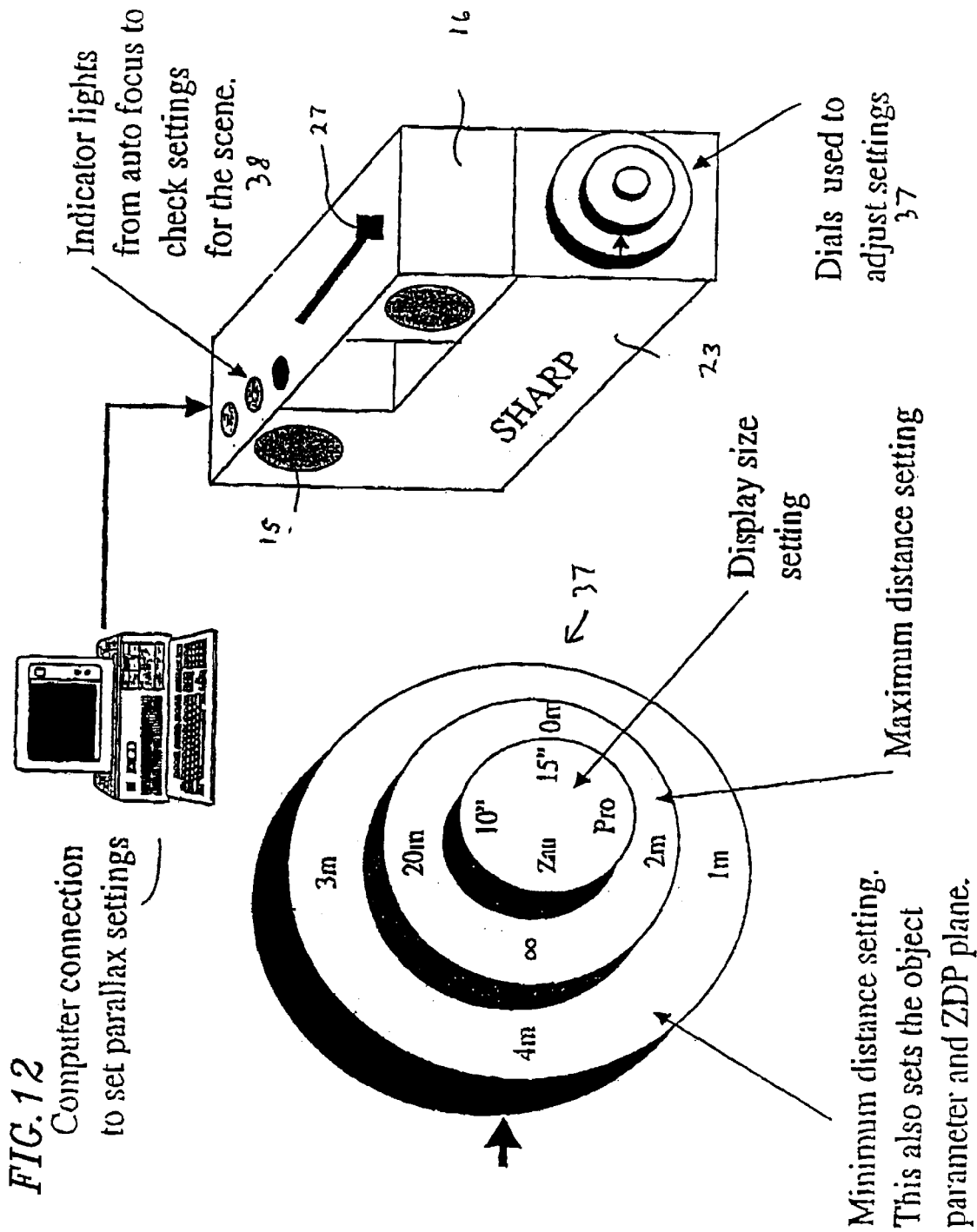
FIG. 12 is a drawing illustrating a modified arrangement of a 3D camera of the type shown in FIG. 3.

Such object distances may be input through a keypad or touch screen based user interface, or alternatively through a dial 37 as shown in FIG. 12.

Autofocus sensors on cameras are used to range-find to points or areas in the scene. The sensors are generally based on an infra-red illumination of the object for ranges up to several meters. Sometimes ultra-sonic sensors are also used. Generally this data is subsequently used to set the focus position of a lens. However, for stereo imaging, useful data on object depth content can be obtained. Autofocus data from the camera can thus be used to measure the close point and perhaps far point of a scene. The information from this sensor is fed back into the control mechanism. The system can be used, for a camera with a given object parameter $\alpha$, to determine the distance to the closest object in the field of view. This may be used to indicate, e.g. by way of a red/green LEDs 38 or similar, whether the object is closer or further than the minimum 3D distance, $\eta$. It may also, if closer than $\eta$, prevent a photograph from being taken.

At present, in many professional camera, multi-point spot focussing is available. In this case, the distance to a number of points in an object can be recorded. It may be possible to extract such date to ascertain near and far point distances and, using the camera equations, adjust the interaxial separation accordingly. One autofocus system could be used for each of the physical parameters necessary.

Alternatively, in some applications, it may be appropriate to measure the distances to objects with a ruler and input them into the camera equations via a user interface on the display. Such a user interface may be by means of dials 37 or by means of an interfaced computer as shown in FIG. 12, or by a user interface on the camera itself, such as by means of a touch screen display on the camera.

The parameters used when the image was captured could be stored as a magnetic stripe on the back of prints or in file headers. In this way, if the target display changes, the image size to be displayed can be manipulated so as to give the maximum viewing comfort of the image for the new display. For instance, an image which was captured for viewing on a 10" (254 mm) diagonal display is replayed on a 20" (508 mm) diagonal display, but from the same viewing distance. If the original capture conditions are contained in an image file, it is possible to automatically zoom the image so that it is only 10" diagonal so as to maintain comfortable viewing conditions.

Figure 13:
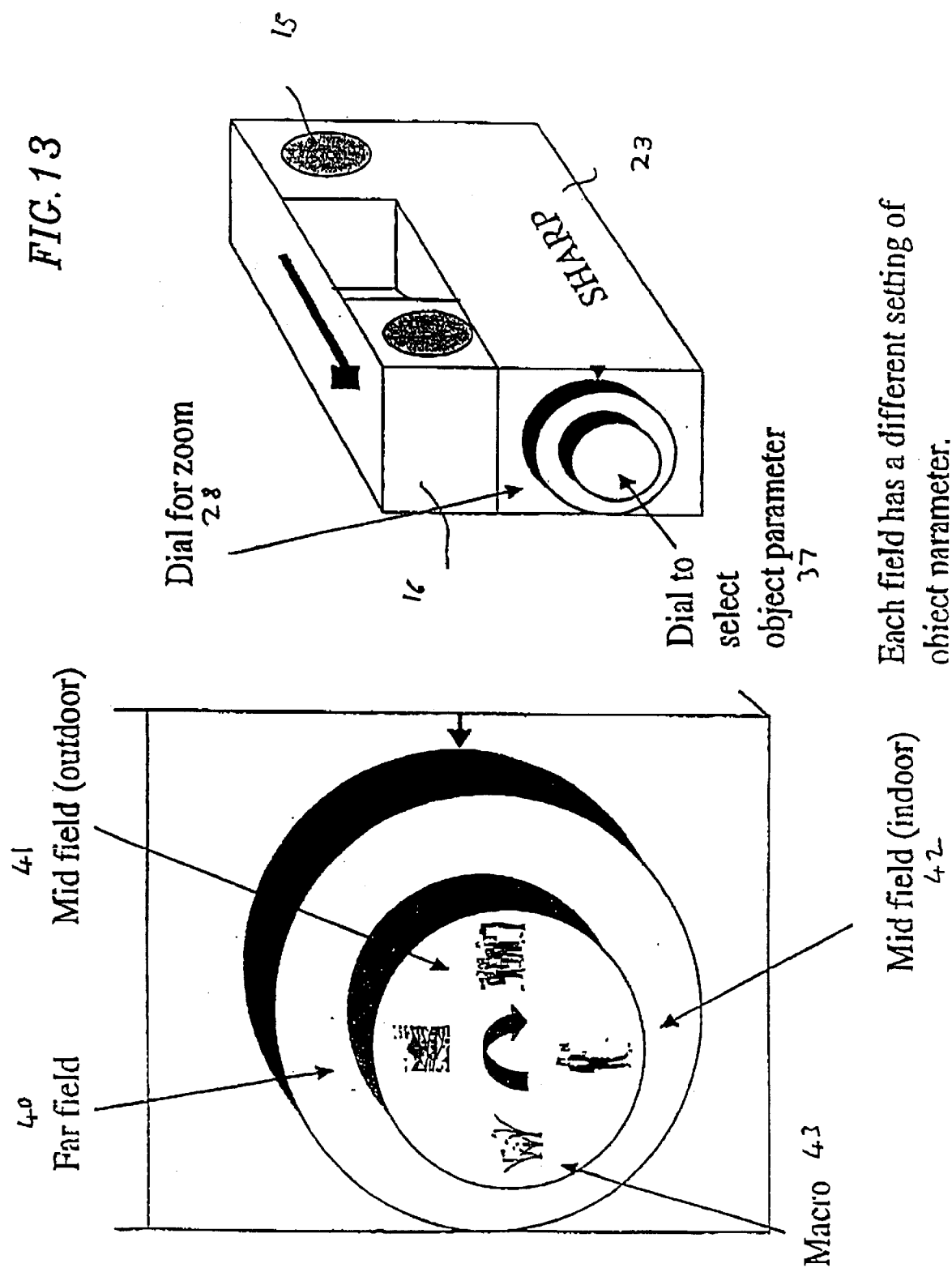
FIG. 13 is a drawings illustrating another modified arrangement of a camera of the type shown in FIG. 3.

In another embodiment, illustrated in FIG. 13, two (or more) values of the object parameter are pre-programmed in the camera where the value taken depends on the autofocus reading at a particular time. A dial 37 selects, for example, from values for landscape 40, mid-field (outdoor) 41, mid-field (indoor) 42 and macro 43. A nominal viewing condition is assumed in this case or pre-programmed for optimal comfort of viewing. Additionally, autofocus data can also be used to check the viability of a 3D photograph of a scene from a manual choice of distances chosen by the user using a dial or switch or downloaded from a computer.

Typical pre-programmed settings could be as follows based on the following parallax values: $P_{ss}/D=5\%$, $-P_{TS}/D=3\%$, a typical camera field of view of 42° full field and a maximum separation of the camera of 150 mm. The screen crop is calculated from equation [11], with the offset excluded in brackets.

| | Far distance, R | Object parameter, α | Near distance, η | ZDP distance, Λ | Screen crop. C |
|---|---|---|---|---|---|
| Far field | ∞ | 0.192 m | 2.4 m | 3.9 m | 10%(5%) |
| Mid field (outdoor) | ∞ | 0.13 m | 1.63 m | 2.61 m | 10%(5%) |
| Mid field (indoor) | 10 m | 0.13 m | 1.4 m | 2.06 m | 12%(6%) |
| Macro | 2 m | 0.13 m | 0.9 m | 1.13 m | 23%(12%) |

The system can also be used in a further embodiment in the following way. The value of the object parameter, display geometry, and the minimum and maximum distances or personal parallax limits can be programmed into a computer and the instructions can be downloaded into the camera. It can also be realised using dials and switches on the camera itself to determine these limits or programmed directly through buttons and an LCD display on the camera. These possibilities are illustrated in FIG. 12. The validity of the input data can be checked internally inside the camera in software. An autofocus system (or more than one) can be used to check that the chosen scene is within these programmed limits. It can be displayed on the LCD as suggested modifications to the input data or as a simple two-colour LED.

It is also possible for all or some of the above possibilities to be on one camera as being user selectable, on the camera or though a computer.

On a digital camera or a scanned photograph or a computer that has downloaded images from the camera, the following features may be provided. The files may be stored in many forms, as compressed or uncompressed files containing the two images plus camera set-up data, or the parallaxes may be estimated from the images and stored as a single image plus a depth map.

The software may process the images to achieve the following:

Correction for misalignment of the heads.

Process for a different display geometry.

Apply ZDP correction.

Intensity, colour and gamma corrections.

Rotation and toe-in alignments or correct for misalignments.

Automatic image alignment and ZDP setting.

Figure 14:
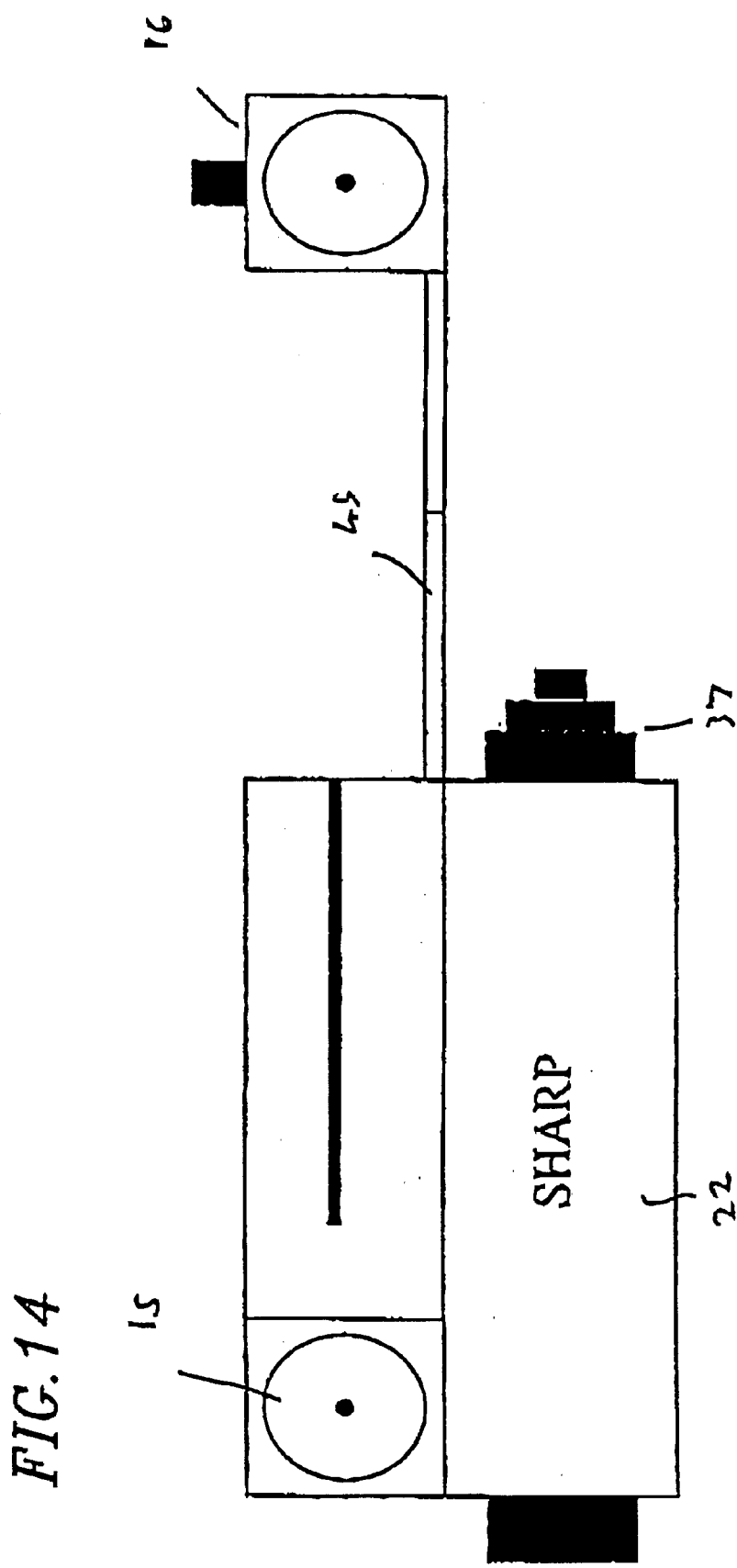
FIG. 14 is a drawing illustrating a further arrangement of a camera of the type shown in FIG. 3 for wider base line separation.

In a further embodiment, one head may be made detachable or the slide 45 extendable as shown in FIG. 14 to achieve a very wide baseline separation for extra stereoscopic resolution on very distant landscape or mountain shots. Post processing can also be applied.

Figure 15:
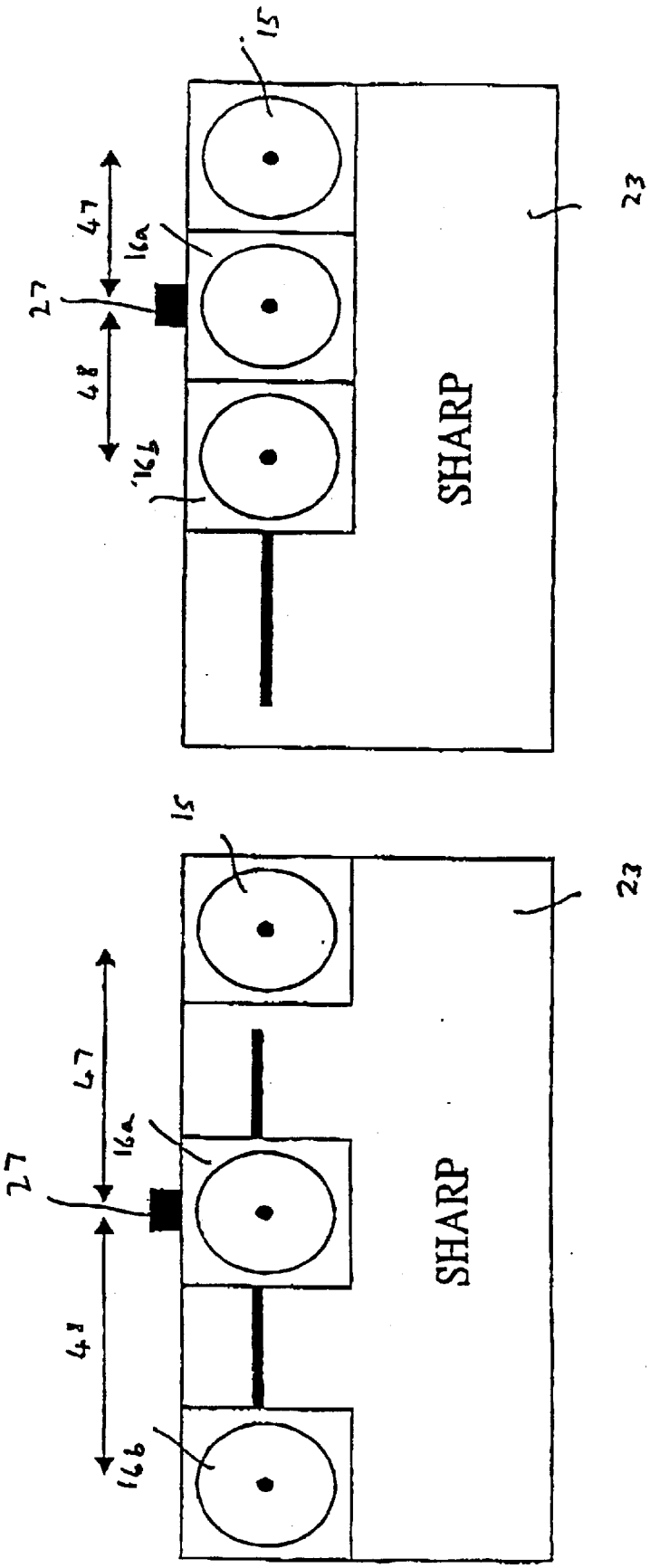
FIG. 15 is a drawing illustrating an arrangement of a three detector head camera constituting an embodiment of the invention.

In a further embodiment, as shown in FIG. 15, the camera has more than two detector heads. In the example shown, the camera has a single fixed detector head 15 and two moveable detector heads 16a and 16b. As in the case of a two head camera, the heads 16a and 16b are constricted to move in a lateral direction perpendicular to the optical axes of the detector heads. The moveable detector heads 16a and 16b are linked or controlled in such a way that the spacing 47 between the detector heads 15 and 16a is maintained equal to the spacing 48 between the detector heads 16a and 16b. The relationship between each head and its position relative to the others must still satisfy the object parameter relationships so that a single button 27 can control all three (or more) heads on the camera to effect the zoom. All of the features described hereinbefore may be incorporated into such a camera without significant alteration in their characteristics. Such a camera may be used for 3D displays which require three (or more) images to be displayed.

It is possible to provide a 3D camera based on the principle of being very simple to use. The camera may have two heads, one movable and encoded with the zoom automatically by one fixed pre-set object parameter. The parallax, ZDP and object maximum and minimum settings may be similarly pre-set so as to be as universally applicable as possible. Example settings may be parallaxes −3%, 5%, object parameter 0.13 mm, minimum distance 1.6 m, maximum distance infinity and ZDP plane 2.6 m. The camera may also have a single autofocus indicator to detect the minimum distance via a green/red indicator. A LCD display is provided for framing the zoom. The user need only point the camera, move one head to frame the zoom and take the picture. Everything else is done automatically before, for example, downloading to a computer and display.

The motion of one or more heads in the above cameras may be motorised with manual or computer control.

Lens aberrations may cause some degradation of the images, particularly as the images are offset on the detectors. Lenses with improved field curvature and distortion characteristics may be preferable to enhance the matching of the two images on the final display. Any such errors would otherwise cause image misalignment which varies across the display resulting in viewer discomfort.

In all of the embodiments considered so far, the assumption has been that the images are taken in landscape mode. In conventional cameras, to take portrait mode images, the camera is simply rotated. However in stereo cameras, each of the images needs to be separately rotated by 90° while the head separation remains horizontal. Thus, the detector heads may each be rotated in order to allow portrait stereo images to be captured. As an alternative, the detectors may be rotated through 90° for portrait mode pictures.

In an alternative embodiment, the camera has a single detector head 16 mounted on a slide bar 45, as shown in FIG. 16. An autofocus system 50 may be included. The photographer frames the image and takes a picture, at which point the zoom setting is encoded. The control computer then computes the required new position of the detector head 16 based on the encoded zoom setting. The detector head 16 is then moved manually or automatically along the slide bar 45. An encoder measures the detector head position. As the detector head 16 moves, a red LED 51 is illuminated in a position where the separation is too large for a good stereo photograph and, when the head is at the appropriate point, a green LED 52 indicates the correct position, at which a second image can be captured with the same zoom setting as used previously. A yellow LED can indicate a position where a photograph will produce a good stereo photograph but the stereo depth is not fully utilised, i.e. the separation is too small.

Alternatively, the detector head 16 may be moved continuously and fired automatically at the appropriate point. In order to overcome image blur in a moving camera, a fast shutter speed or auxiliary lighting may be required. Thus the user does not have to be concerned about accurately positioning the camera.

Alternatively a motor can translate the detector head 16. In this way, a fully automatic rig is provided which just requires the photographer's skill to frame the image by pointing direction and zoom settings.

Such a camera has all of the functionality previously described but may not be suitable for imaging moving objects. Photographers can concentrate on image composition without the need to be concerned about 3D geometry requirements. In particular, this system allows standard cameras to be mounted on the rail, so that the cost of stereo imaging is reduced. The camera can be controlled completely automatically.

Figure 17:
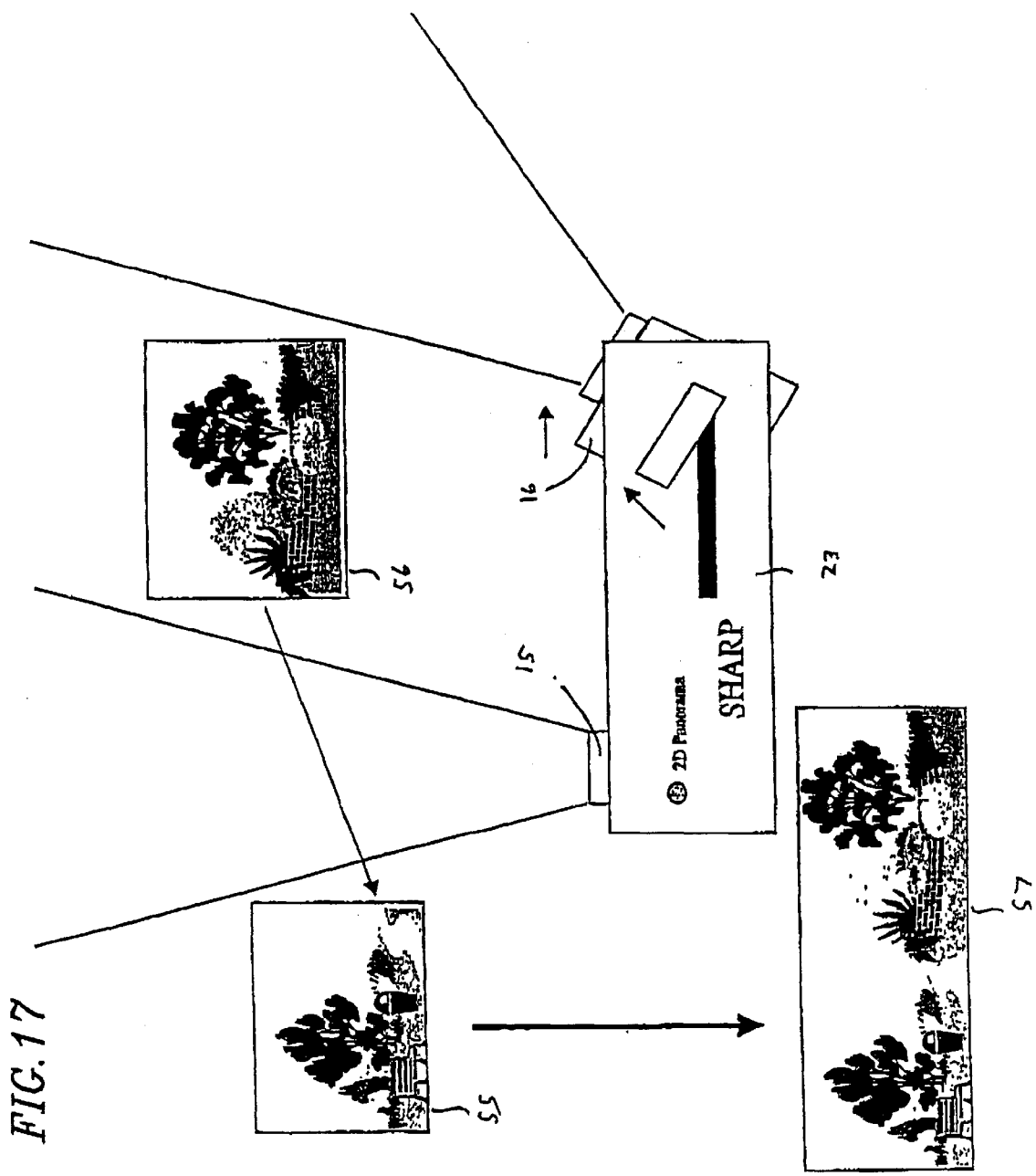
FIG. 17 is a diagram illustrating use of a camera of the type shown in FIG. 4 but modified for capturing panoramic 2D images.

FIG. 17 illustrates another camera in which the head 16 can be toed out by an angle slightly less than half the field of view angle so that the fields of view just overlap. The images 55 and 56 are seam matched in software to give extra long 2D panoramic prints 57. Alternatively, the detector heads may be placed adjacent each other so that there is negligible stereo base and an image with enhanced image resolution can be obtained by combining the two images.

What is claimed is:

1. A three dimensional camera comprising: at least one imaging and detecting device which is moveable in a direction substantially perpendicular to the optical axis thereof; and defining means for defining a non-zero depth range of a scene whose image is to be captured at first and second positions; and characterised by further comprising deriving and limiting means for deriving as a function of the depth range a separation between said first and second positions and for limiting the separation such that the parallax between images captured at the first and second positions is less than a predetermined maximum parallax throughout the depth range, wherein the optical axes of the or each device in said first and second positions are parallel.

2. A camera as claimed in claim 1, characterised by comprising at least two imaging and detecting devices.

3. A camera as claimed in claim 2, characterised in that the devices are substantially identical to each other.

4. A camera as claimed in claim 2, characterised in that detectors of the devices are disposed in a common plane substantially perpendicular to the optical axes.

5. A camera as claimed in claim 2, characterised in that the detector of at least one of the devices is offset laterally with respect to the optical axis of the device.

6. A camera as claimed in claim 2, characterised in that one of the devices is fixed.

7. A camera as claimed in claim 2, characterised in that the detector of each device is rotatable through substantially 90° about the optical axis of the device.

8. A camera as claimed in claim 1, characterised by further comprising a visual indicator for indicating whether a stereoscopic image to be captured is within predetermined parallax limits.

9. A camera as claimed in claim 8, characterised in that the indicator comprises a viewfinder.

10. A camera as claimed in claim 8, characterised in that the indicator comprises an indicator light.

11. A camera as claimed in claim 1, characterized in that the predetermined maximum parallax is a function of a predetermined display geometry on which captured images are intended to be displayed.

12. A camera as claimed in claim 11, characterised in that the predetermined display geometry comprises display screen size, intended viewing distance and eye separation.

13. A camera as claimed in claim 1, characterised in that the defining means is arranged to define at least one fixed depth range limit.

14. A camera as claimed in claim 13, characterised in that the at least one fixed depth range limit approximates infinity.

15. A camera as claimed in claim 13, characterised in that the at least one fixed depth range limit comprises a camera minimum focus distance.

16. A camera as claimed in claim 1, characterised in that the defining means comprises first selecting means for manually selecting the depth range.

17. A camera as claimed in claim 16, characterised in that the first selecting means is arranged to provide manual entry of the depth range.

18. A camera as claimed in claim 16, characterised in that the first selecting means is arranged to select from a plurality of predetermined depth ranges.

19. A camera as claimed in claim 1, characterised in that the defining means is arranged to measure at least one depth range limit.

20. A camera as claimed in claim 19, characterised in that the defining means comprises an auto-focus sensor.

21. A camera as claimed in claim 19, characterised in that the at least one depth range limit comprises a near depth point.

22. A camera as claimed in claim 21, characterised in that the defining means comprises second selecting means for manually selecting from a plurality of fixed far depth points.

23. A camera as claimed in claim 1, characterised in that the or each device has a variable field of view.

24. A camera as claimed in claim 23, characterised by further comprising third selecting means for manually selecting one of the separation and the field of view and fourth selecting means for automatically selecting the other of the separation and the field of view as a function of the one of the separation and the field of view.

25. A camera as claimed in claim 24, characterised in that the function is a monotonically increasing function.

26. A camera as claimed in claim 24, characterised in that the function is also a function of the maximum and minimum distances from the camera of objects whose images are to be captured.

27. A camera as claimed in claim 24, characterised in that the function is also a function of the geometry of a display for displaying images captured by the camera.

28. A camera as claimed in claim 27, characterised by further comprising means for supplying to the fourth selecting means data representing the display size and viewing distance.

29. A camera as claimed in claim 23, characterised in that the field of view of each device is selectable by selecting a portion of the detector.

30. A camera as claimed in claim 23, characterised in that the field of view of each device is selectable by adjusting the focal length of an imaging optical system of the device.

31. A camera as claimed in claim 23, characterised in that the devices comprise zoom lenses whose optical nodes are disposed in at least one common plane perpendicular to the optical axes.

32. A camera as claimed in claim 1, characterised by further comprising more than two devices with the spacings between adjacent pairs of the devices being maintained substantially equal to each other.

33. A camera as claimed in claim 1, characterised in that the detector of the or each device comprises a charge-coupled device.

* * * * *